(12) United States Patent
Harper et al.

(10) Patent No.: US 8,409,404 B2
(45) Date of Patent: Apr. 2, 2013

(54) MULTI-PLY PAPER TOWEL WITH CREPED PLIES

(75) Inventors: Frank D. Harper, Neenah, WI (US); Joseph H. Miller, Neenah, WI (US); Mark L. Robinson, Kaukauna, WI (US); Thomas J. Phillip, Hilbert, WI (US); Steven L. Edwards, Fremont, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 232 days.

(21) Appl. No.: 12/438,387

(22) PCT Filed: Aug. 24, 2007

(86) PCT No.: PCT/US2007/076712
§ 371 (c)(1),
(2), (4) Date: Feb. 23, 2009

(87) PCT Pub. No.: WO2008/027799
PCT Pub. Date: Mar. 6, 2008

(65) Prior Publication Data
US 2010/0224338 A1    Sep. 9, 2010

Related U.S. Application Data

(60) Provisional application No. 60/841,346, filed on Aug. 30, 2006.

(51) Int. Cl.
*D21H 27/40* (2006.01)
*B31F 1/12* (2006.01)
*B31F 1/07* (2006.01)

(52) U.S. Cl. ......... 162/132; 162/111; 162/117; 162/204

(58) Field of Classification Search .................. 162/109, 162/111–113, 117, 123–133, 141, 149, 204–205; 428/156, 172
See application file for complete search history.

(56) References Cited

U.S. PATENT DOCUMENTS

| 3,432,936 A | 3/1969 | Cole et al. |
| 3,545,705 A | 12/1970 | Hodgson |
| 3,549,742 A | 12/1970 | Benz |
| 3,556,907 A | 1/1971 | Nystrand |
| 3,556,932 A | 1/1971 | Coscia et al. |
| 3,556,933 A | 1/1971 | Williams et al. |
| 3,700,623 A | 10/1972 | Keim |

(Continued)

FOREIGN PATENT DOCUMENTS
WO   WO2004033793 A2   4/2004

OTHER PUBLICATIONS

Lars Westfelt, Chemistry of Paper Wet-Strength, in Cellulose Chemistry and Technology, 1979, pp. 813-825, vol. 13.

(Continued)

*Primary Examiner* — Jose A Fortuna
(74) *Attorney, Agent, or Firm* — Laura L. Bozek

(57) ABSTRACT

A multi-ply absorbent towel made from papermaking fiber comprising at least a first ply and a second ply bonded together, the towel having a basis weight of greater than 30 lbs per 3000 ft² ream (48.8 gsm) and less than 50 lbs per 3000 ft² ream (81.4 gsm), wherein the plies are selected and adhered together such that the towel typically exhibits (i) a GM TEA, mm-g/mm² of greater than [0.00125 (GM Tensile, g/3")−0.75] and (ii) a GM Tensile Modulus, g/in/%, less than [0.0083 (GM Tensile Strength, g/3")+15.4] {(i) a GM TEA, mm g/mm², of greater than [0.00952 (GM Tensile, g/cm)−0.75] and (ii) a GM Tensile Modulus, g/cm/%, less than [0.0249 (GM Tensile Strength, g/cm)+6.06}.

29 Claims, 25 Drawing Sheets

U.S. PATENT DOCUMENTS

| | | | |
|---|---|---|---|
| 3,772,076 A | 11/1973 | Keim | |
| 3,858,623 A | 1/1975 | Lefkowitz | |
| 3,867,225 A | 2/1975 | Nystrand | |
| 3,974,025 A | 8/1976 | Ayers | |
| 3,994,771 A | 11/1976 | Morgan, Jr. et al. | |
| 4,041,989 A | 8/1977 | Johansson et al. | |
| 4,071,050 A | 1/1978 | Codornin | |
| 4,102,737 A | 7/1978 | Morton | |
| 4,112,982 A | 9/1978 | Bugge et al. | |
| 4,149,571 A | 4/1979 | Burroughs | |
| 4,157,276 A | 6/1979 | Wandel et al. | |
| 4,161,195 A | 7/1979 | Khan | |
| 4,182,381 A | 1/1980 | Gisbourne | |
| 4,184,519 A | 1/1980 | McDonald et al. | |
| 4,239,065 A | 12/1980 | Trokhan | |
| 4,314,589 A | 2/1982 | Buchanan et al. | |
| 4,359,069 A | 11/1982 | Hahn | |
| 4,376,455 A | 3/1983 | Hahn | |
| 4,379,735 A | 4/1983 | MacBean | |
| 4,440,597 A | 4/1984 | Wells et al. | |
| 4,445,638 A | 5/1984 | Connell et al. | |
| 4,453,573 A | 6/1984 | Thompson | |
| 4,482,429 A | 11/1984 | Klowak | |
| 4,490,925 A | 1/1985 | Smith | |
| 4,528,316 A | 7/1985 | Soerens et al. | |
| 4,529,480 A | 7/1985 | Trokhan | |
| 4,533,437 A | 8/1985 | Curran et al. | |
| 4,551,199 A | 11/1985 | Weldon | |
| 4,564,052 A | 1/1986 | Borel | |
| 4,592,395 A | 6/1986 | Borel | |
| 4,605,585 A | 8/1986 | Johansson | |
| 4,611,639 A | 9/1986 | Bugge | |
| 4,640,741 A | 2/1987 | Tsuneo | |
| 4,689,119 A | 8/1987 | Weldon | |
| 4,709,732 A | 12/1987 | Kinnunen | |
| 4,759,391 A | 7/1988 | Waldvogel et al. | |
| 4,759,976 A | 7/1988 | Dutt | |
| 4,803,032 A | 2/1989 | Schulz | |
| 4,834,838 A | 5/1989 | Klowak | |
| 4,849,054 A | 7/1989 | Klowak | |
| 4,942,077 A | 7/1990 | Wendt et al. | |
| 4,967,085 A | 10/1990 | Bryan et al. | |
| 4,973,512 A | 11/1990 | Stanley et al. | |
| 4,998,568 A | 3/1991 | Vohringer | |
| 5,016,678 A | 5/1991 | Borel et al. | |
| 5,023,132 A | 6/1991 | Stanley et al. | |
| 5,054,525 A | 10/1991 | Vohringer | |
| 5,066,532 A | 11/1991 | Gaisser | |
| 5,098,519 A | 3/1992 | Ramasubramanian et al. | |
| 5,103,874 A | 4/1992 | Lee | |
| 5,114,777 A | 5/1992 | Gaisser | |
| 5,167,261 A | 12/1992 | Lee | |
| 5,182,164 A | 1/1993 | Eklund et al. | |
| 5,199,261 A | 4/1993 | Baker | |
| 5,199,467 A | 4/1993 | Lee | |
| 5,211,815 A | 5/1993 | Ramasubramanian et al. | |
| 5,215,617 A | 6/1993 | Grupe | |
| 5,219,004 A | 6/1993 | Chiu | |
| 5,225,269 A | 7/1993 | Bohlin | |
| 5,245,025 A | 9/1993 | Trokhan et al. | |
| 5,277,761 A | 1/1994 | Van Phan et al. | |
| 5,328,565 A | 7/1994 | Rasch et al. | |
| 5,368,696 A | 11/1994 | Cunnane, III et al. | |
| 5,372,876 A | 12/1994 | Johnson et al. | |
| 5,379,808 A | 1/1995 | Chiu | |
| 5,449,026 A | 9/1995 | Lee | |
| 5,607,551 A | 3/1997 | Farrington, Jr. et al. | |
| 5,618,612 A | 4/1997 | Gstrein | |
| 5,657,797 A | 8/1997 | Townley et al. | |
| 5,690,149 A | 11/1997 | Lee | |
| 5,690,788 A | 11/1997 | Marinack et al. | |
| 5,851,353 A | 12/1998 | Fiscus et al. | |
| 5,865,955 A | 2/1999 | Ilvespaa et al. | |
| 5,968,590 A | 10/1999 | Ahonen et al. | |
| 6,001,421 A | 12/1999 | Ahonen et al. | |
| 6,119,362 A | 9/2000 | Sundqvist | |
| 6,187,137 B1 | 2/2001 | Druecke et al. | |
| 6,261,666 B1 | 7/2001 | Enderby et al. | |
| 6,287,426 B1 | 9/2001 | Edwards et al. | |
| 6,331,228 B1 * | 12/2001 | Heath et al. | 162/117 |
| 6,350,349 B1 | 2/2002 | Hermans et al. | |
| 6,368,454 B1 | 4/2002 | Dwiggins et al. | |
| 6,432,267 B1 | 8/2002 | Watson | |
| 6,447,640 B1 | 9/2002 | Watson et al. | |
| 6,517,673 B1 * | 2/2003 | Heath et al. | 162/117 |
| 6,649,024 B2 | 11/2003 | Oriaran et al. | |
| 6,699,360 B2 * | 3/2004 | Heath et al. | 162/111 |
| 6,746,558 B2 | 6/2004 | Hoeft et al. | |
| 6,827,819 B2 * | 12/2004 | Dwiggins et al. | 162/123 |
| 7,399,378 B2 | 7/2008 | Edwards et al. | |
| 7,494,563 B2 | 2/2009 | Edwards et al. | |
| 7,718,036 B2 * | 5/2010 | Sumnicht et al. | 162/146 |
| 2002/0104630 A1 * | 8/2002 | Dwiggins et al. | 162/123 |
| 2002/0148584 A1 | 10/2002 | Edwards et al. | |
| 2003/0041989 A1 | 3/2003 | Oriarian et al. | |
| 2003/0136531 A1 * | 7/2003 | Edwards et al. | 162/111 |
| 2003/0192662 A1 * | 10/2003 | Heath et al. | 162/111 |
| 2004/0168780 A1 * | 9/2004 | Dwiggins et al. | 162/125 |
| 2004/0209058 A1 | 10/2004 | Chou et al. | |
| 2004/0238135 A1 * | 12/2004 | Edwards et al. | 162/111 |
| 2005/0006040 A1 | 1/2005 | Boettcher et al. | |
| 2005/0103455 A1 | 5/2005 | Edwards et al. | |
| 2005/0217814 A1 | 10/2005 | Super et al. | |
| 2005/0241786 A1 | 11/2005 | Edwards et al. | |
| 2005/0241787 A1 * | 11/2005 | Murray et al. | 162/113 |
| 2005/0279471 A1 | 12/2005 | Murray et al. | |
| 2006/0042767 A1 | 3/2006 | Bhat et al. | |
| 2006/0081347 A1 | 4/2006 | Kershaw et al. | |
| 2006/0093788 A1 * | 5/2006 | Behm et al. | 428/137 |
| 2006/0237154 A1 | 10/2006 | Edwards et al. | |
| 2006/0289133 A1 | 12/2006 | Yeh et al. | |
| 2006/0289134 A1 | 12/2006 | Yeh et al. | |
| 2007/0204966 A1 | 9/2007 | Chou et al. | |
| 2008/0038515 A1 * | 2/2008 | Kershaw et al. | 428/152 |
| 2008/0264589 A1 | 10/2008 | Chou et al. | |
| 2009/0194244 A1 * | 8/2009 | Harper et al. | 162/111 |
| 2010/0224338 A1 * | 9/2010 | Harper et al. | 162/132 |
| 2011/0011545 A1 * | 1/2011 | Edwards et al. | 162/111 |

OTHER PUBLICATIONS

Herbert H. Espy, Alkaline-Curing Polymeric Amine-Epichlorohydrin Resins in Wet Strength Resins and Their Application, 1994, Chapter 2, pp. 14-44.

Mousa M. Nazhad, Emma J. Harris, Christopher T. J. Dodson, Richard J. Kerekes, The Influence of Formation on Tensile Strength of Paper Made From Mechanical Pulps, 2000 TAPPI Journal Peer Reviewed Paper, Dec. 2000, pp. 1-9, Pulp and Paper Centre, Vancouver, British Columbia, Canada.

* cited by examiner

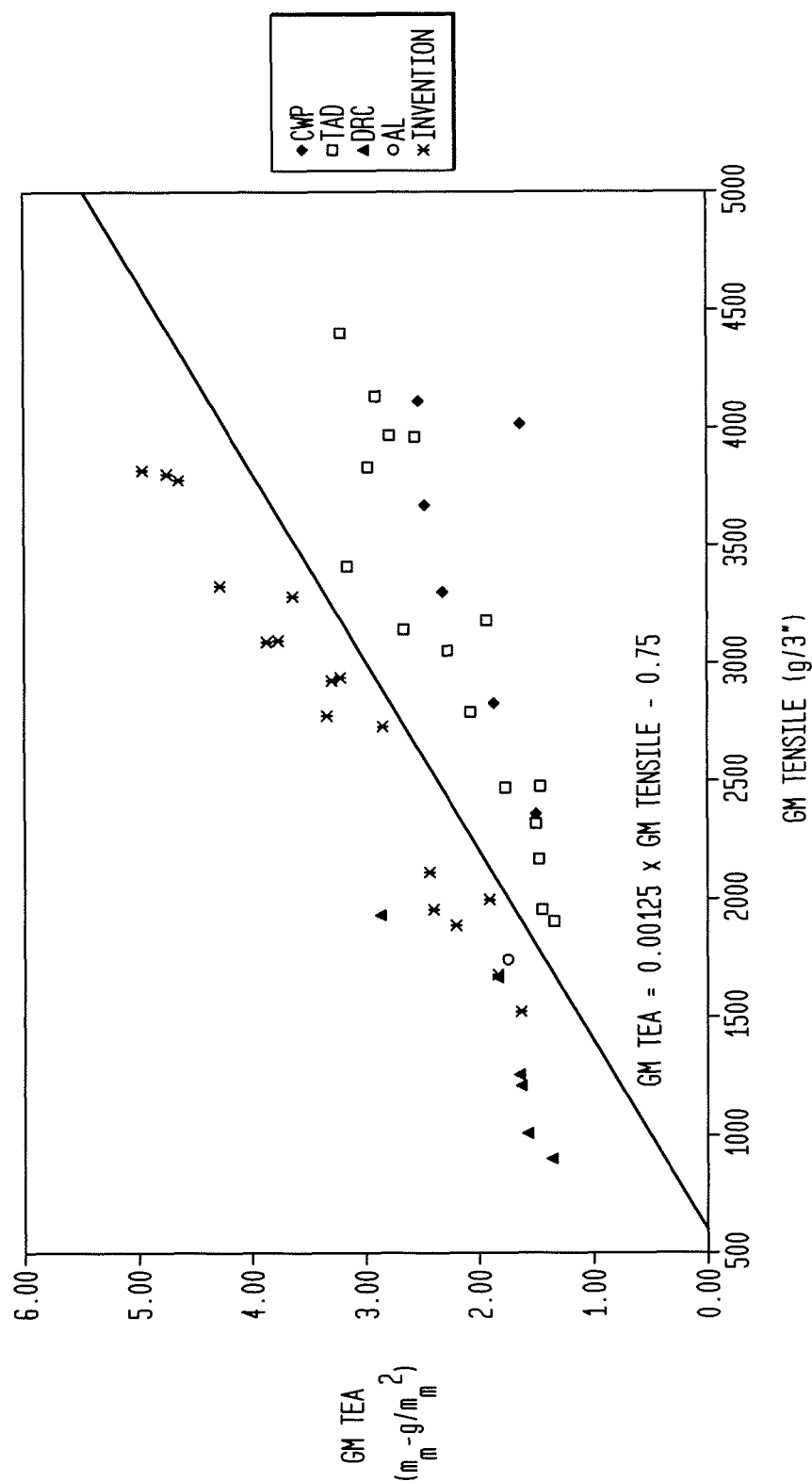

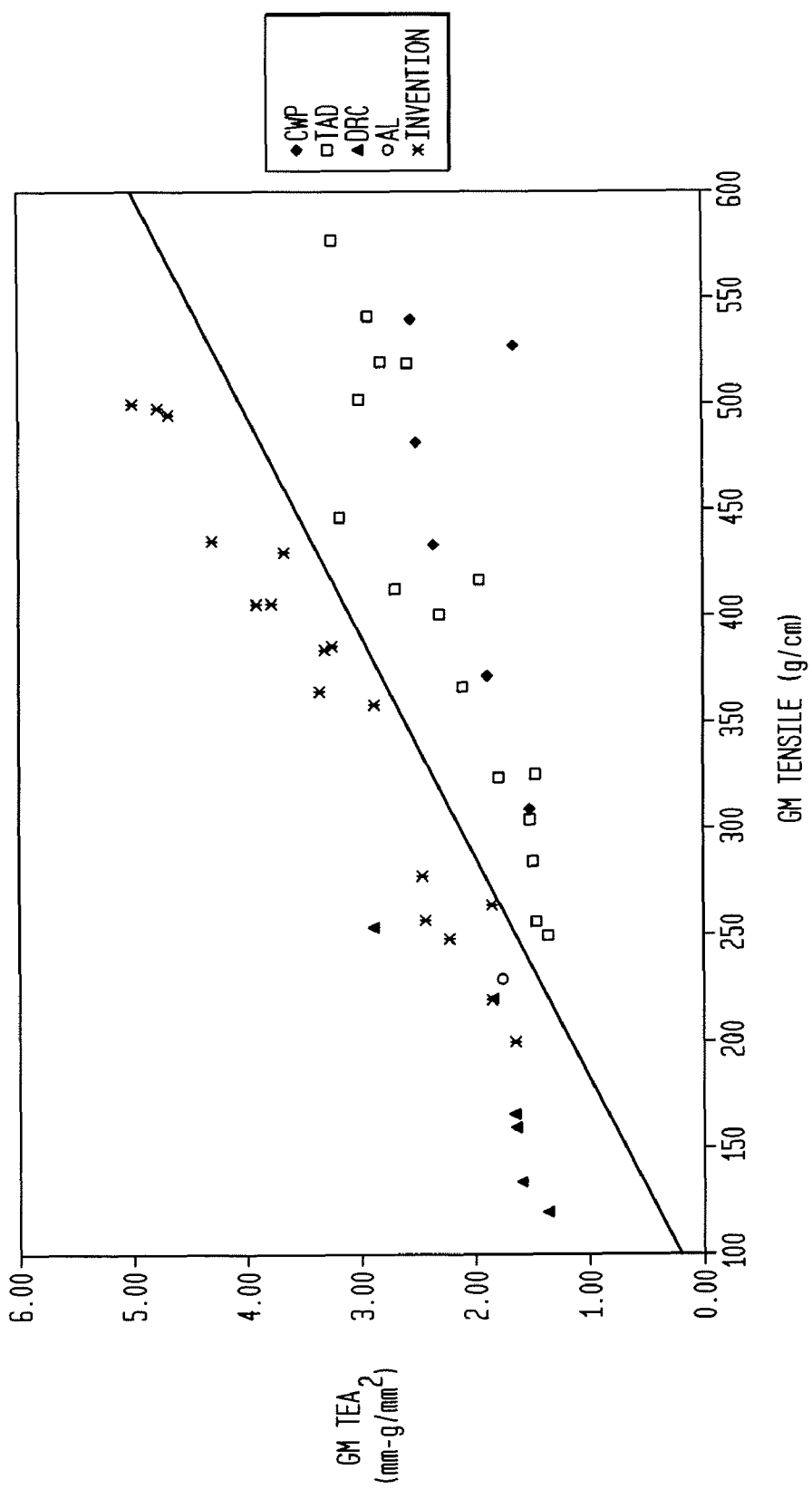

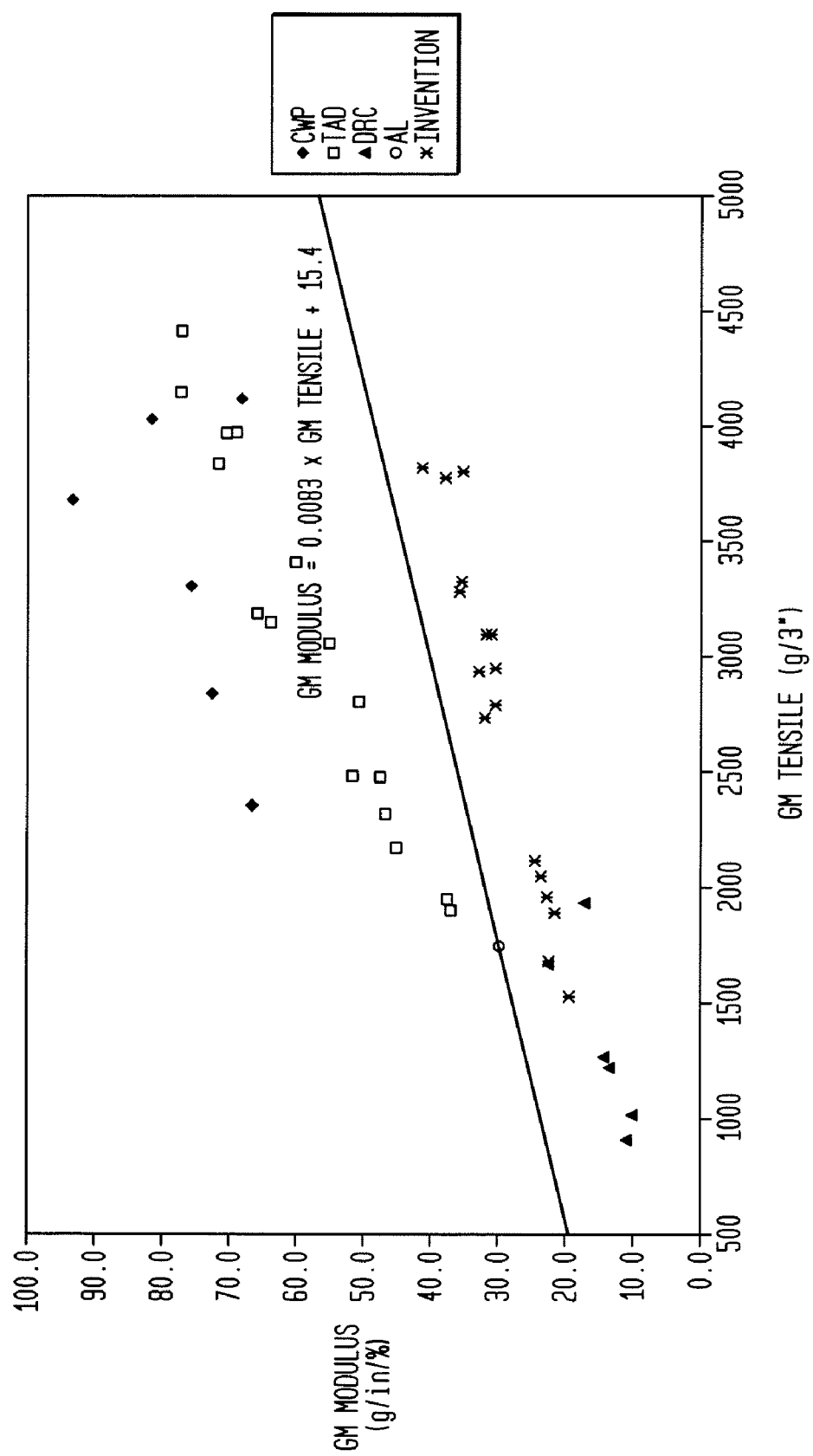

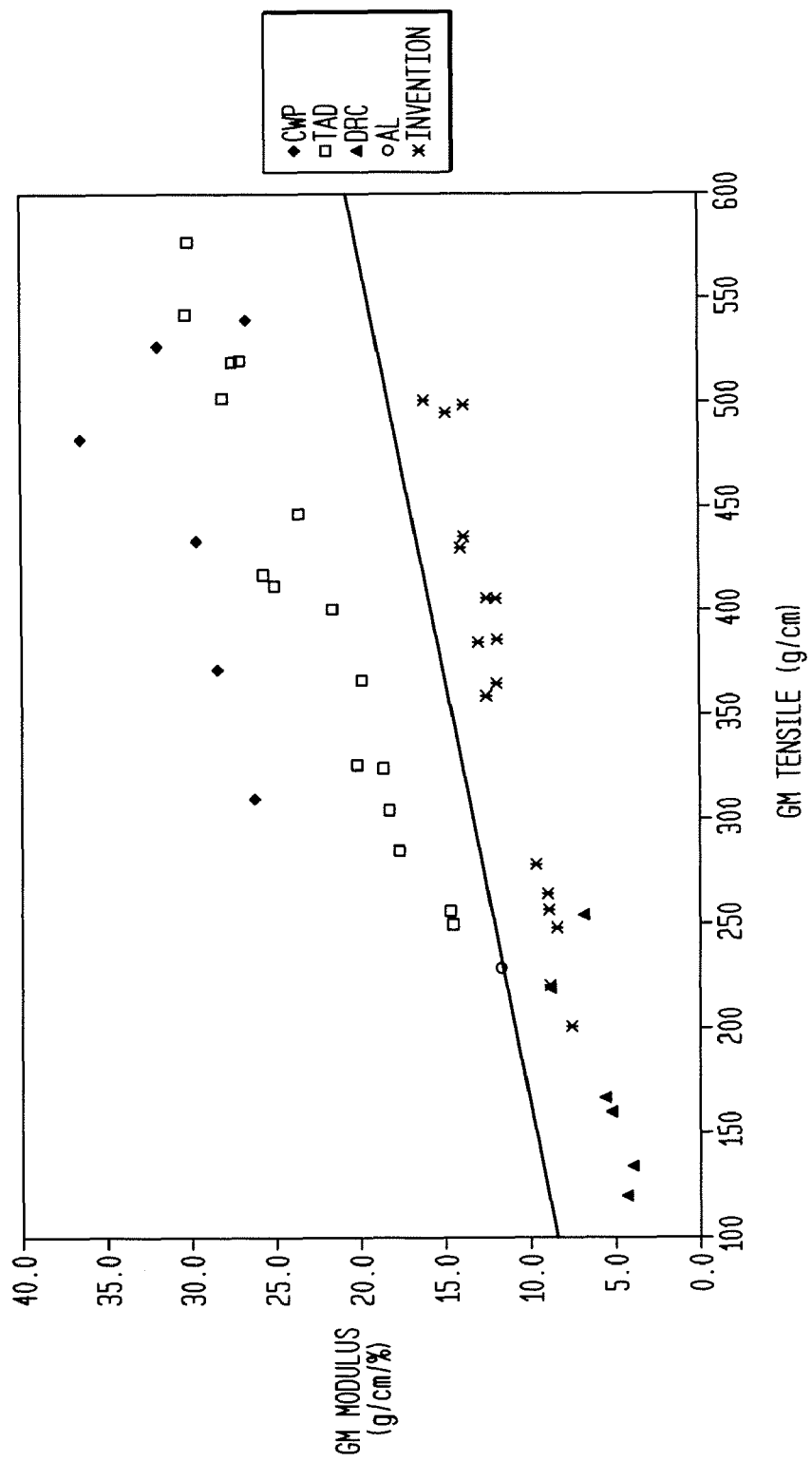

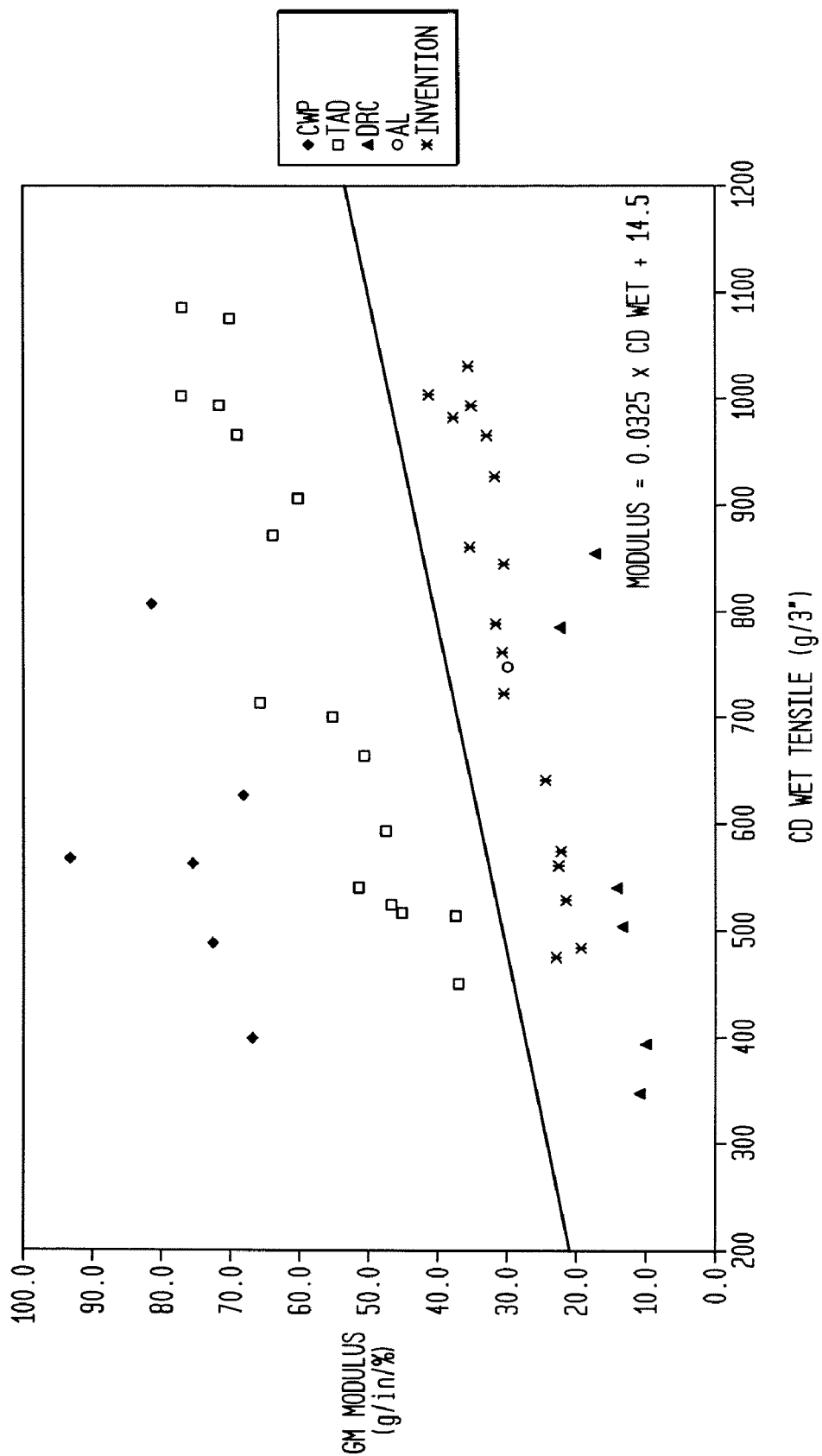

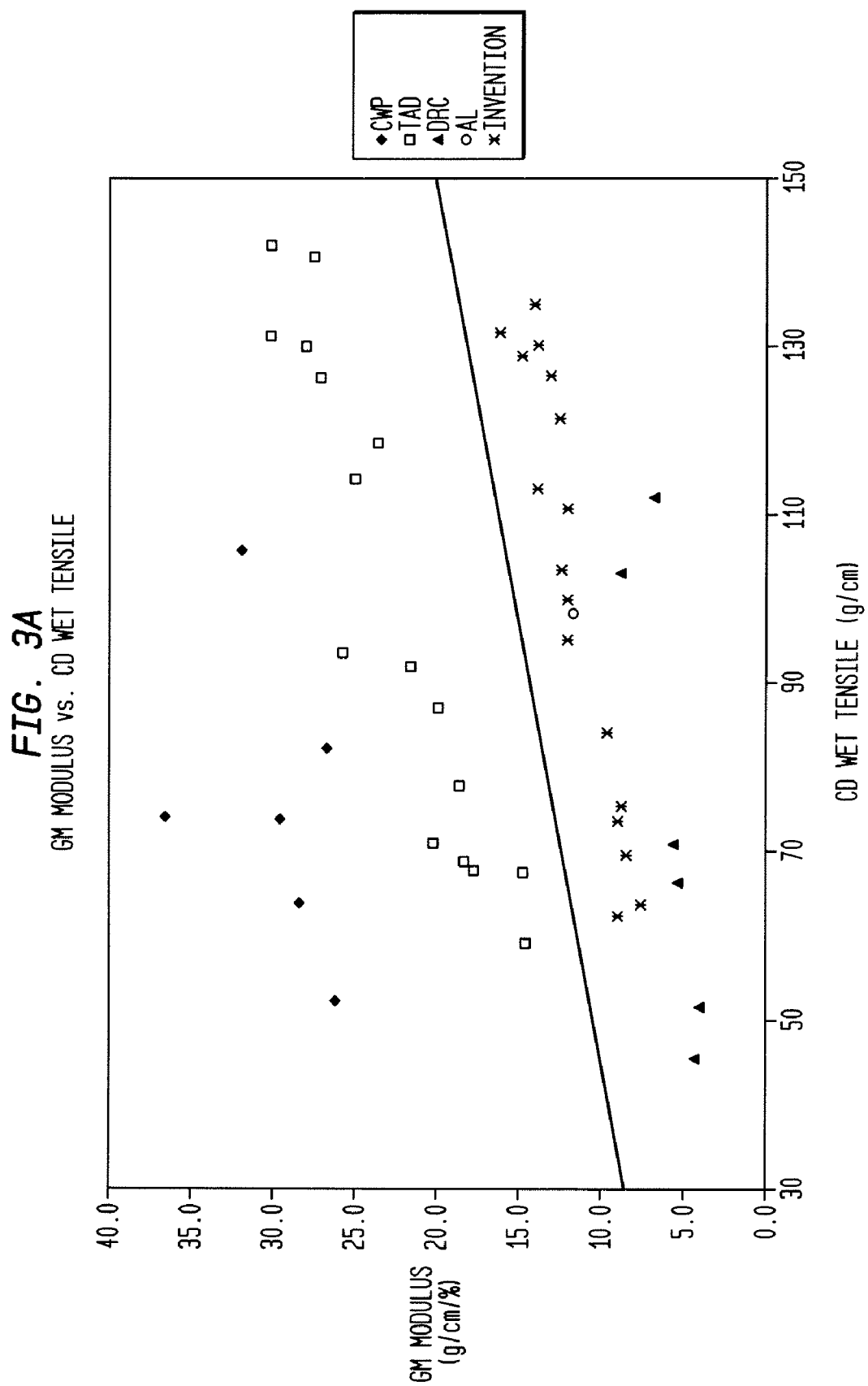

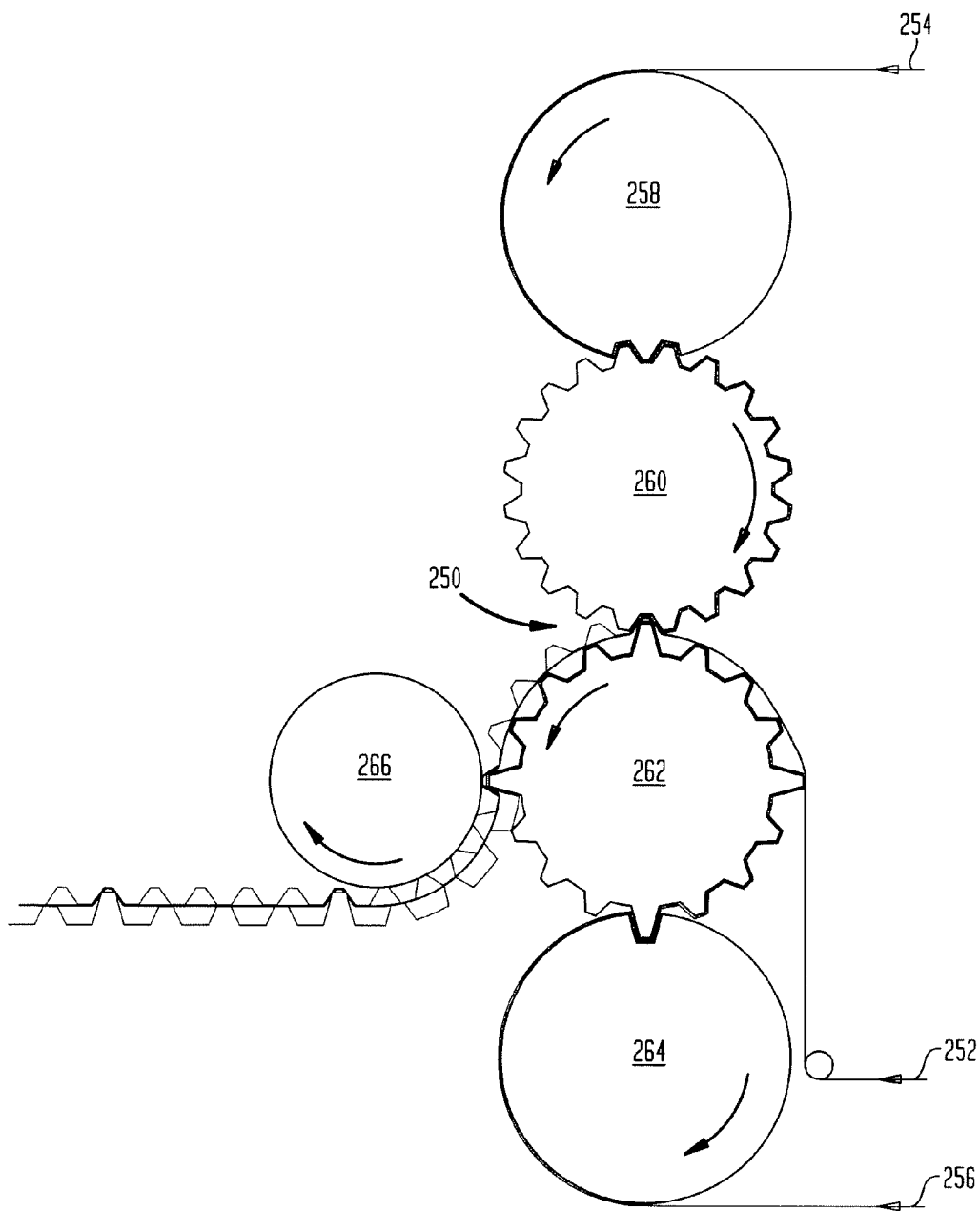

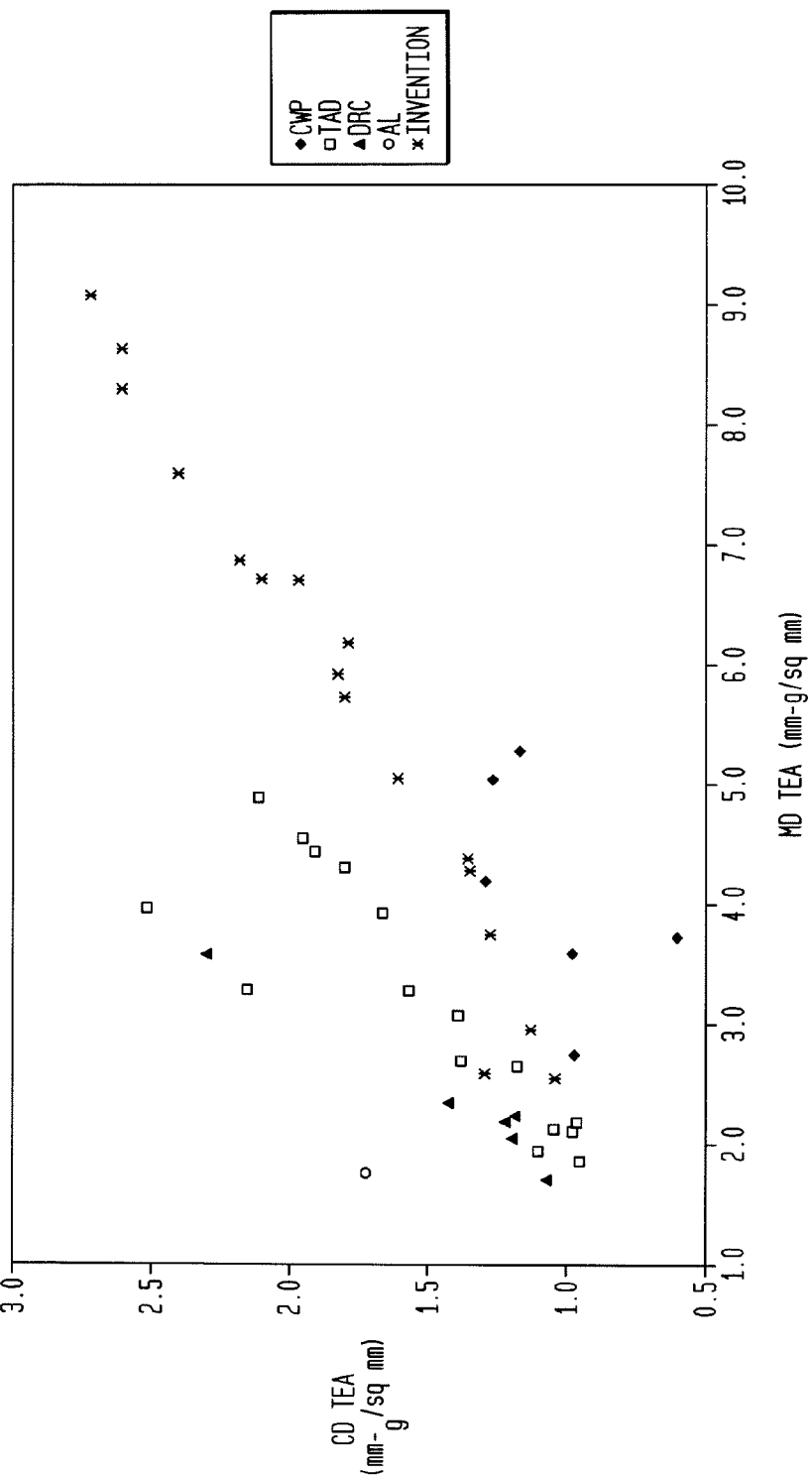

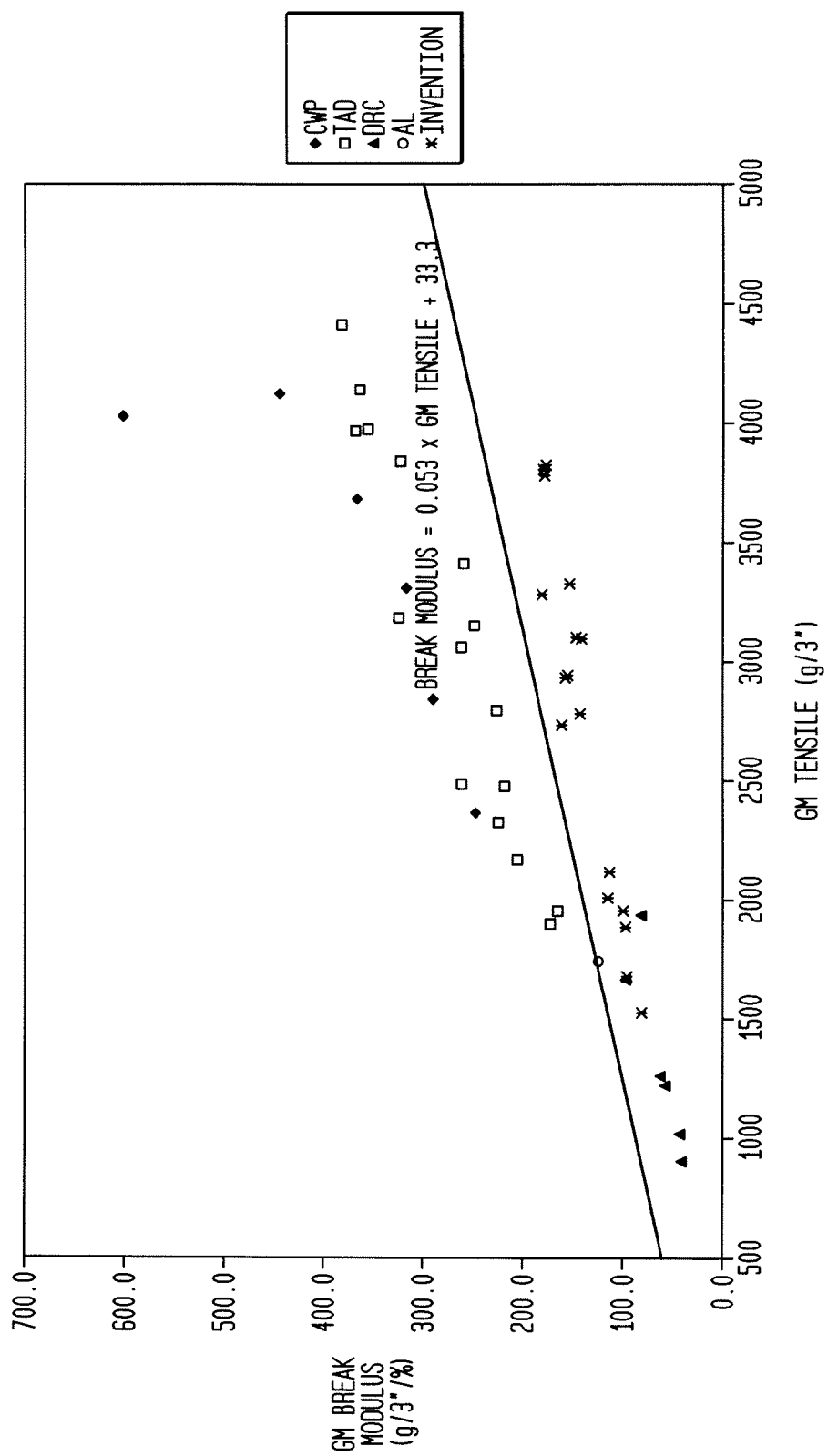

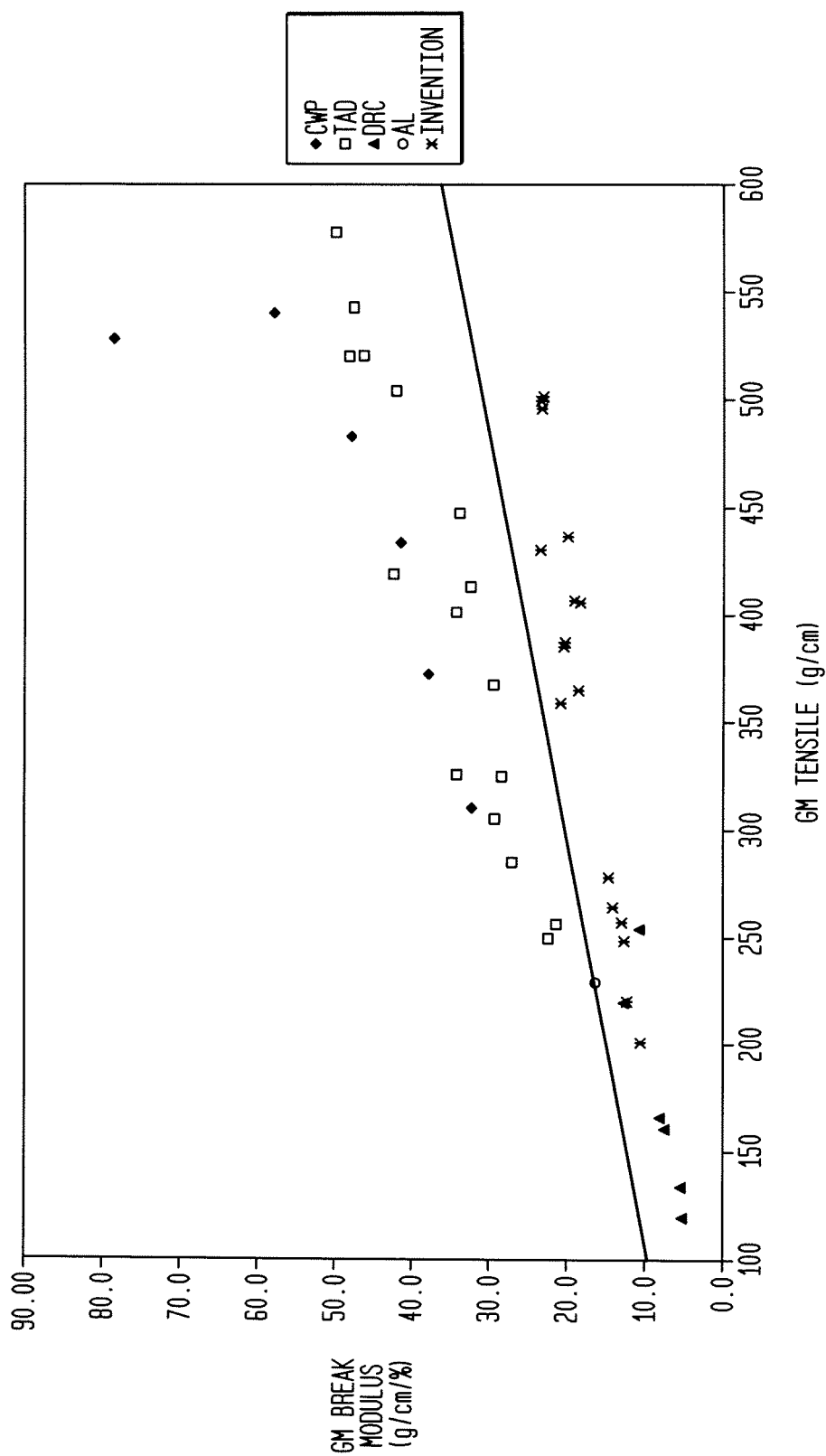

FIG. 13
CD STRETCH vs. MD STRETCH

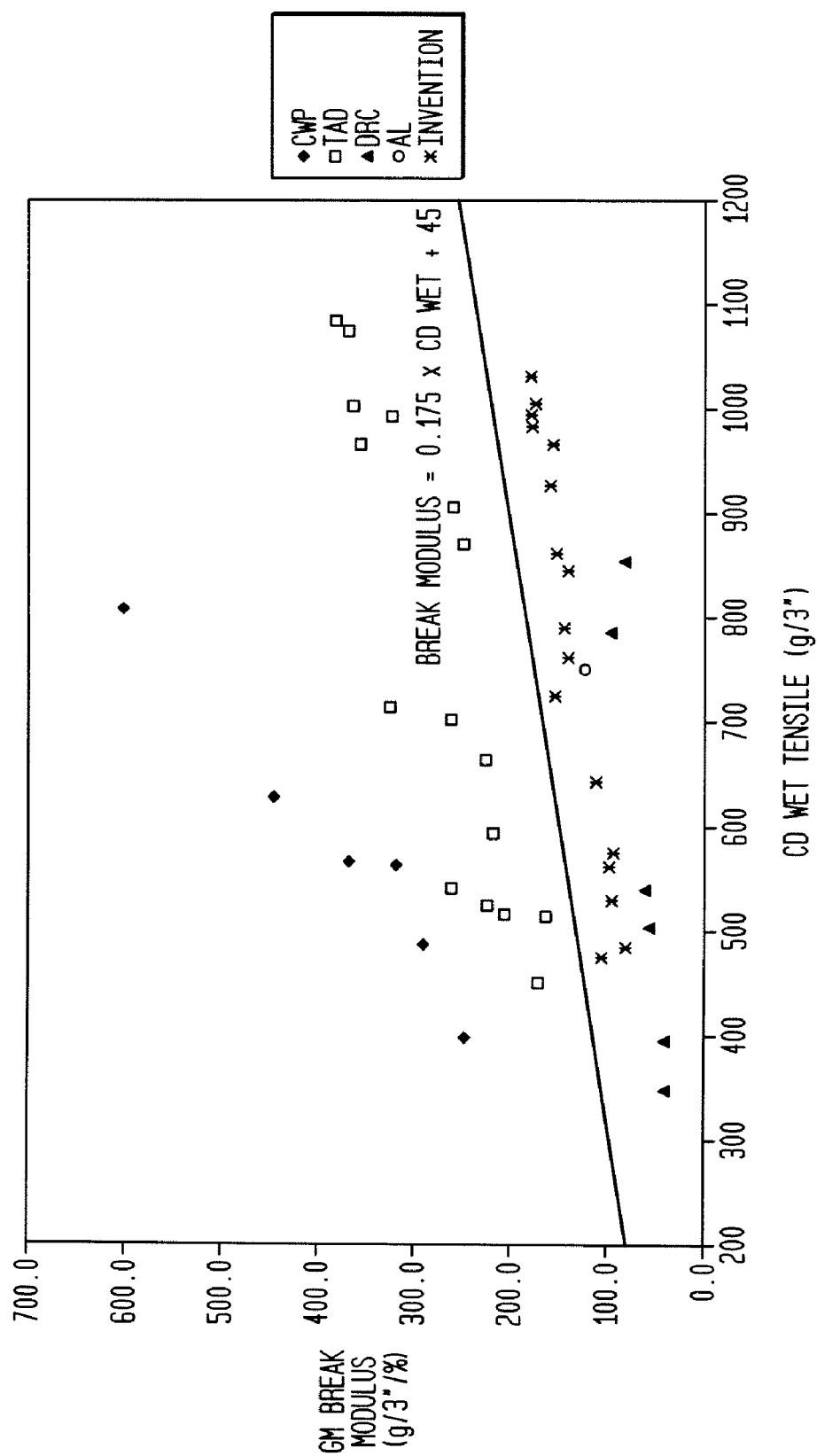

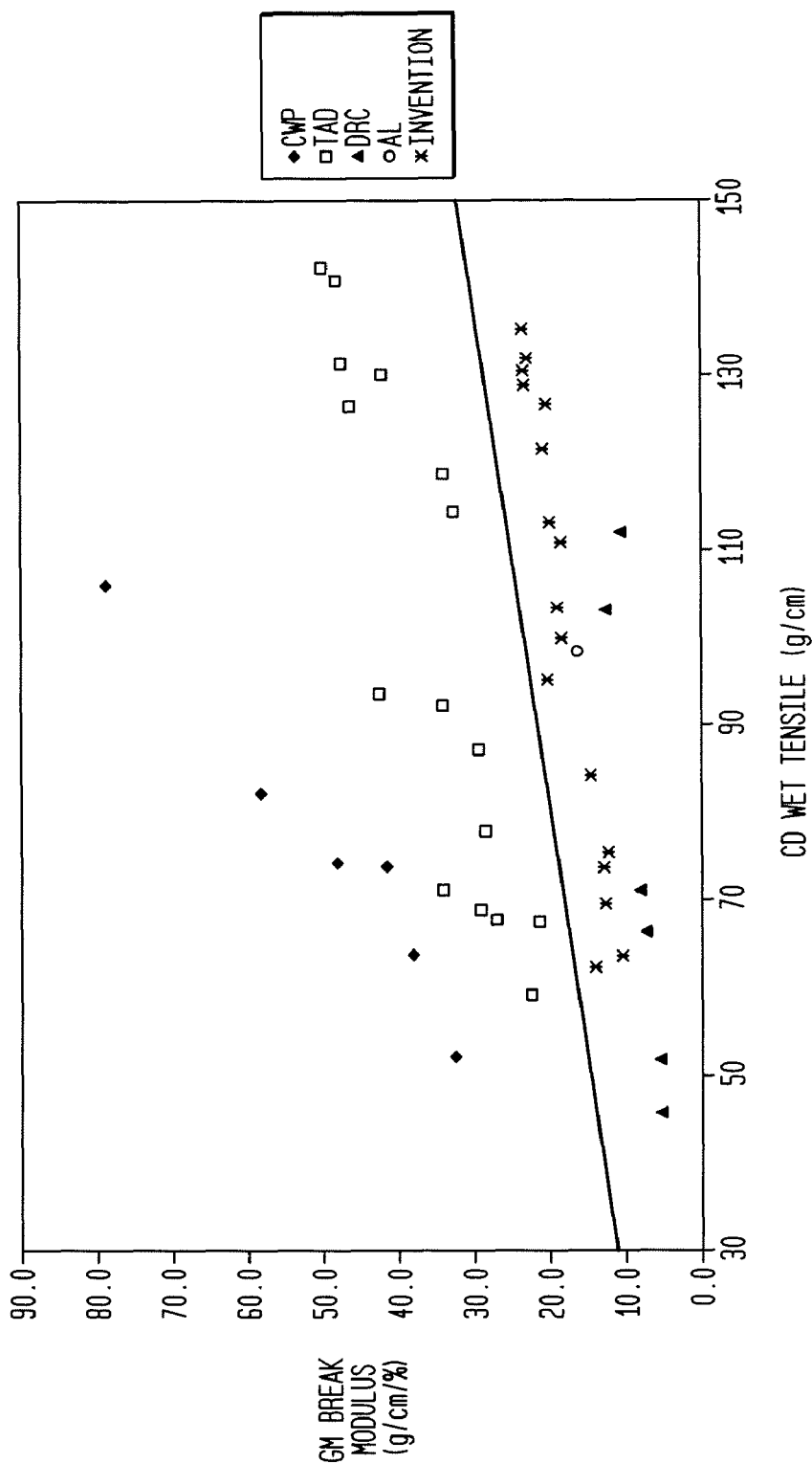

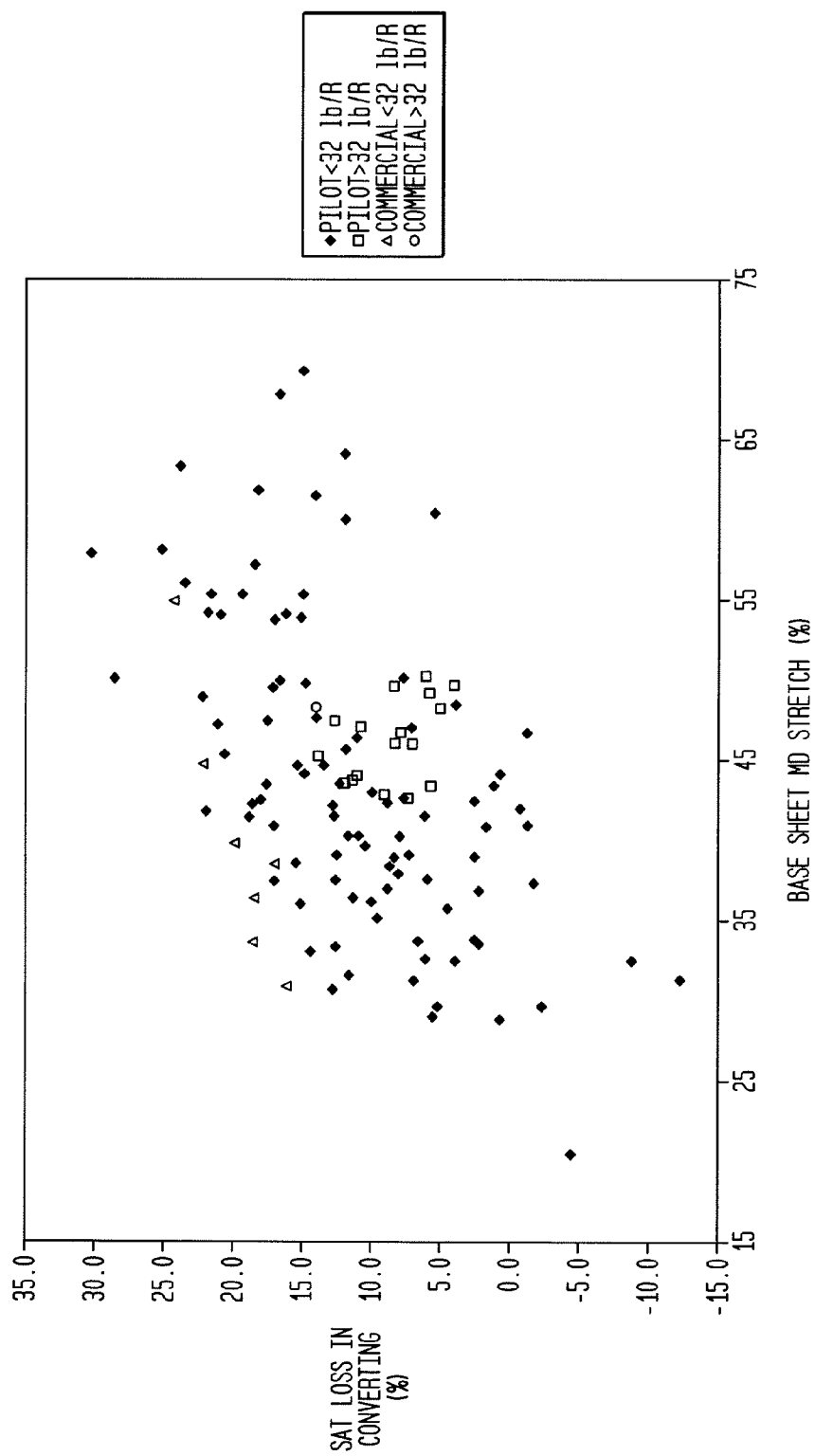

MD BENDING LENGTH vs. MD TENSILE

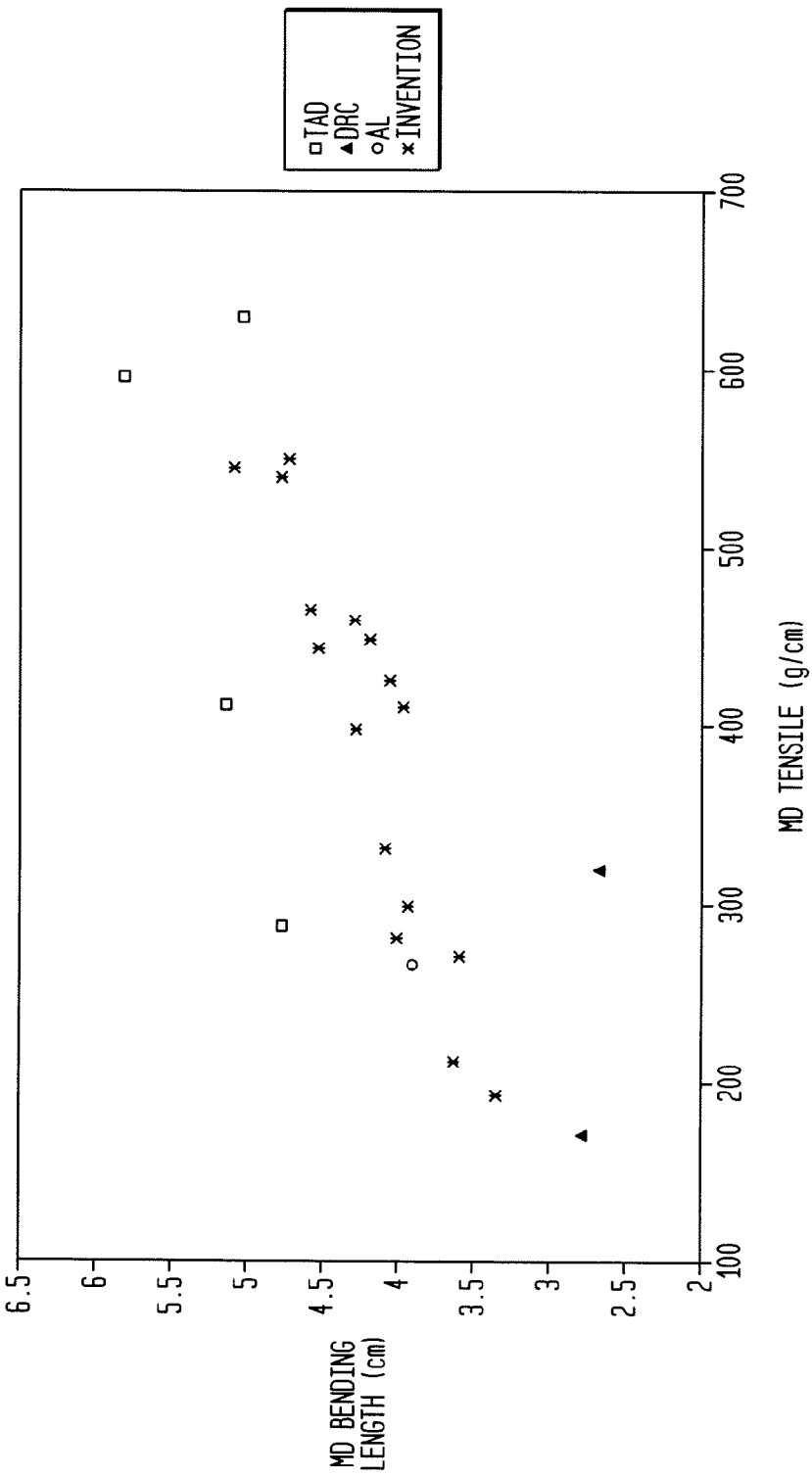

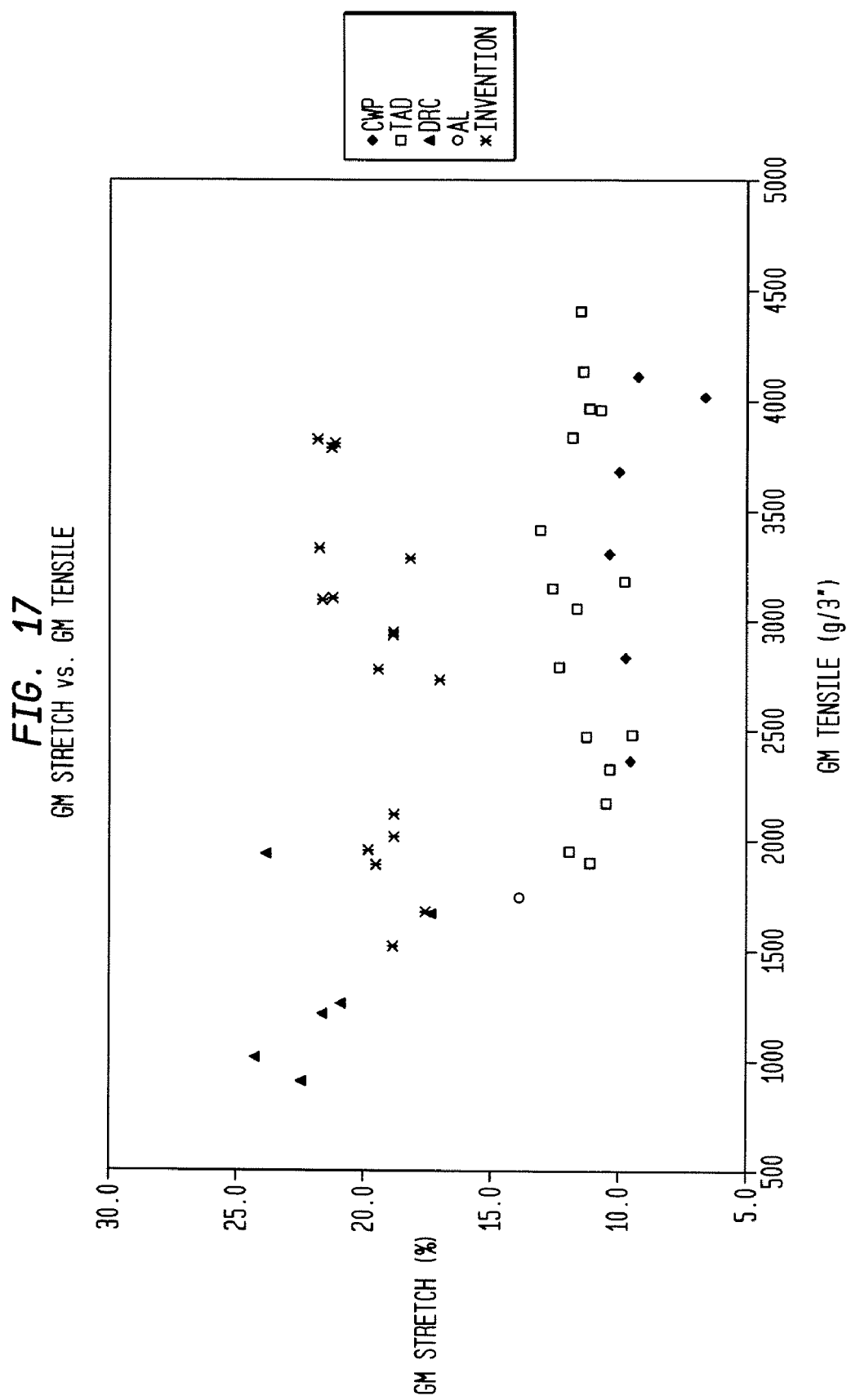

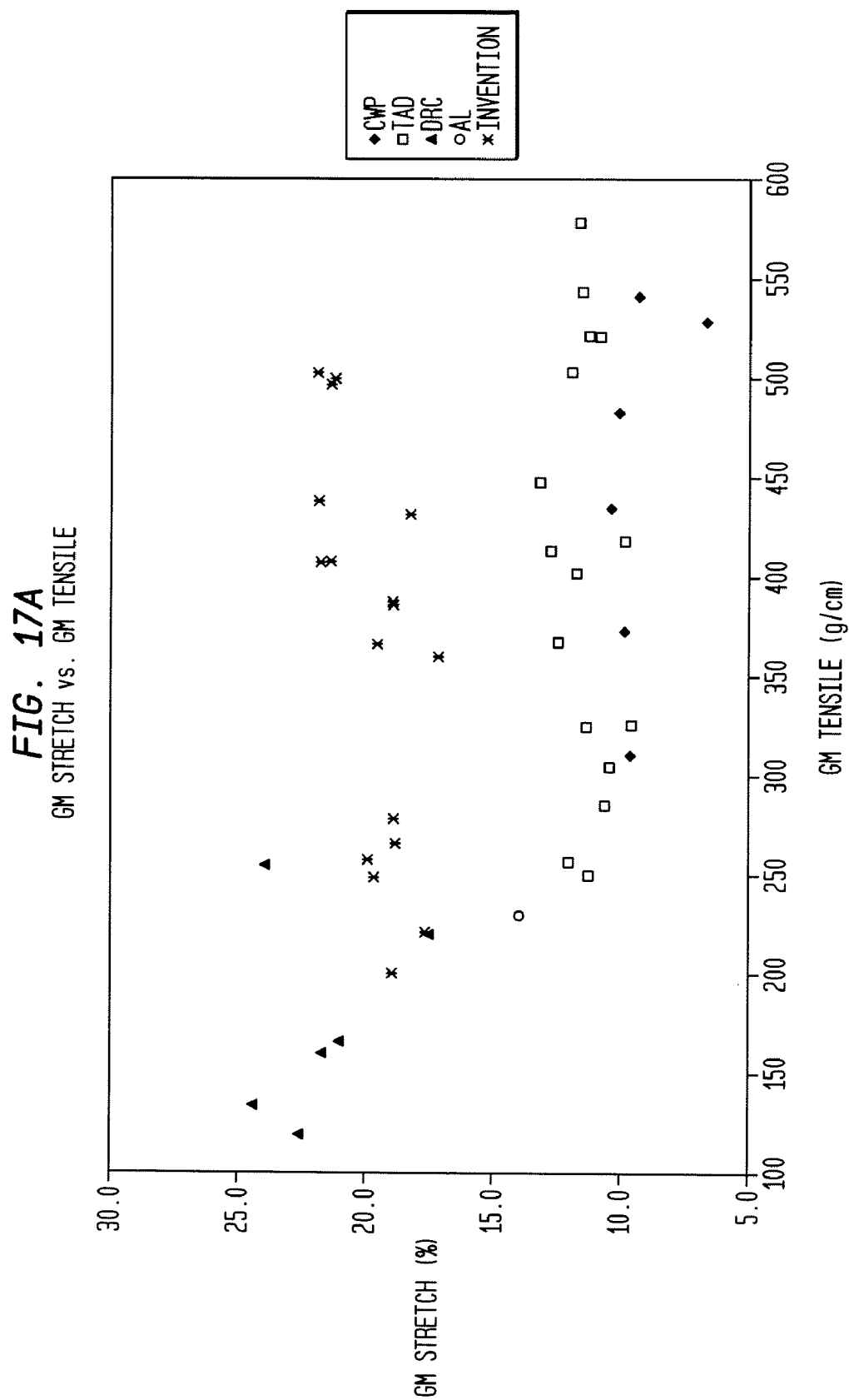

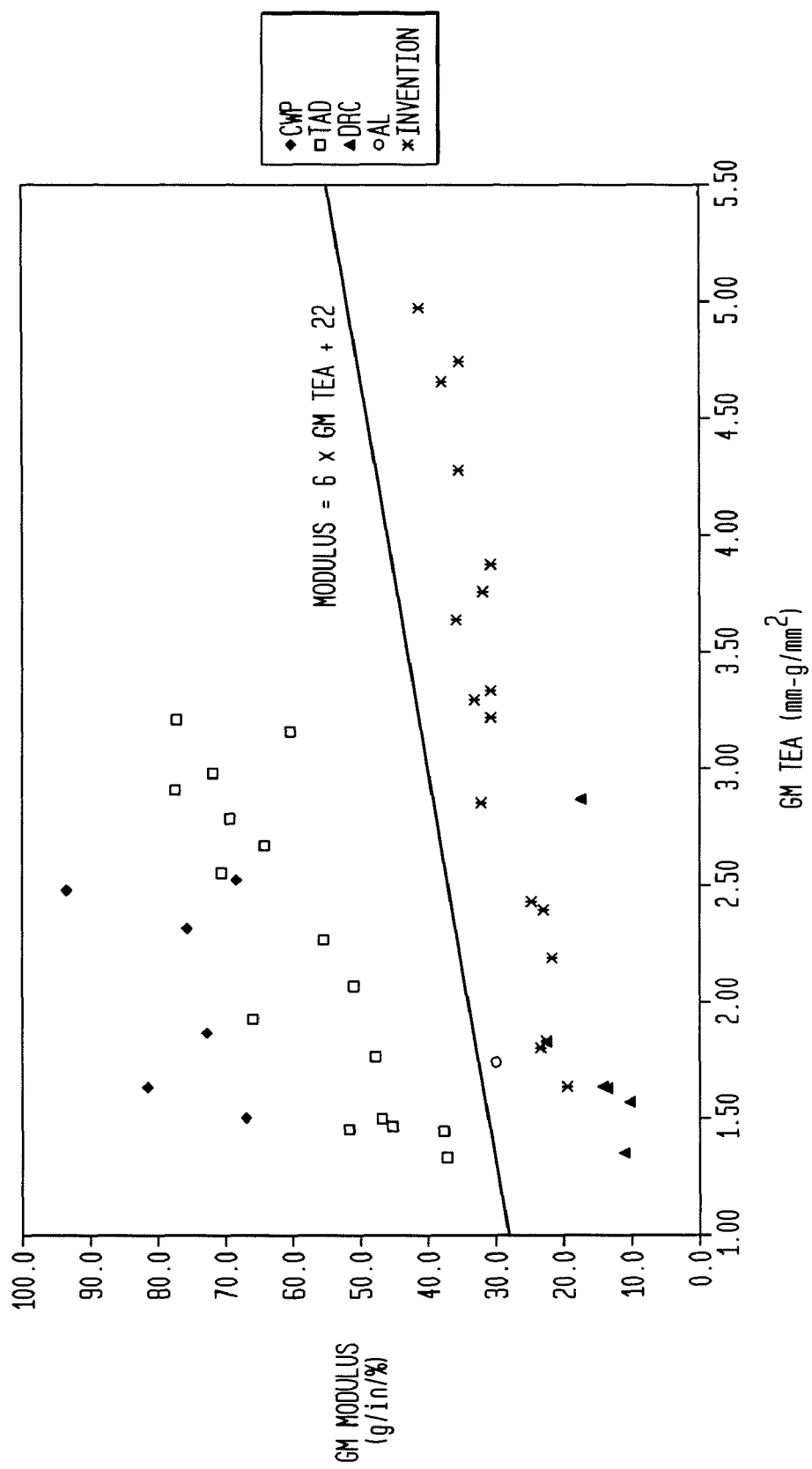

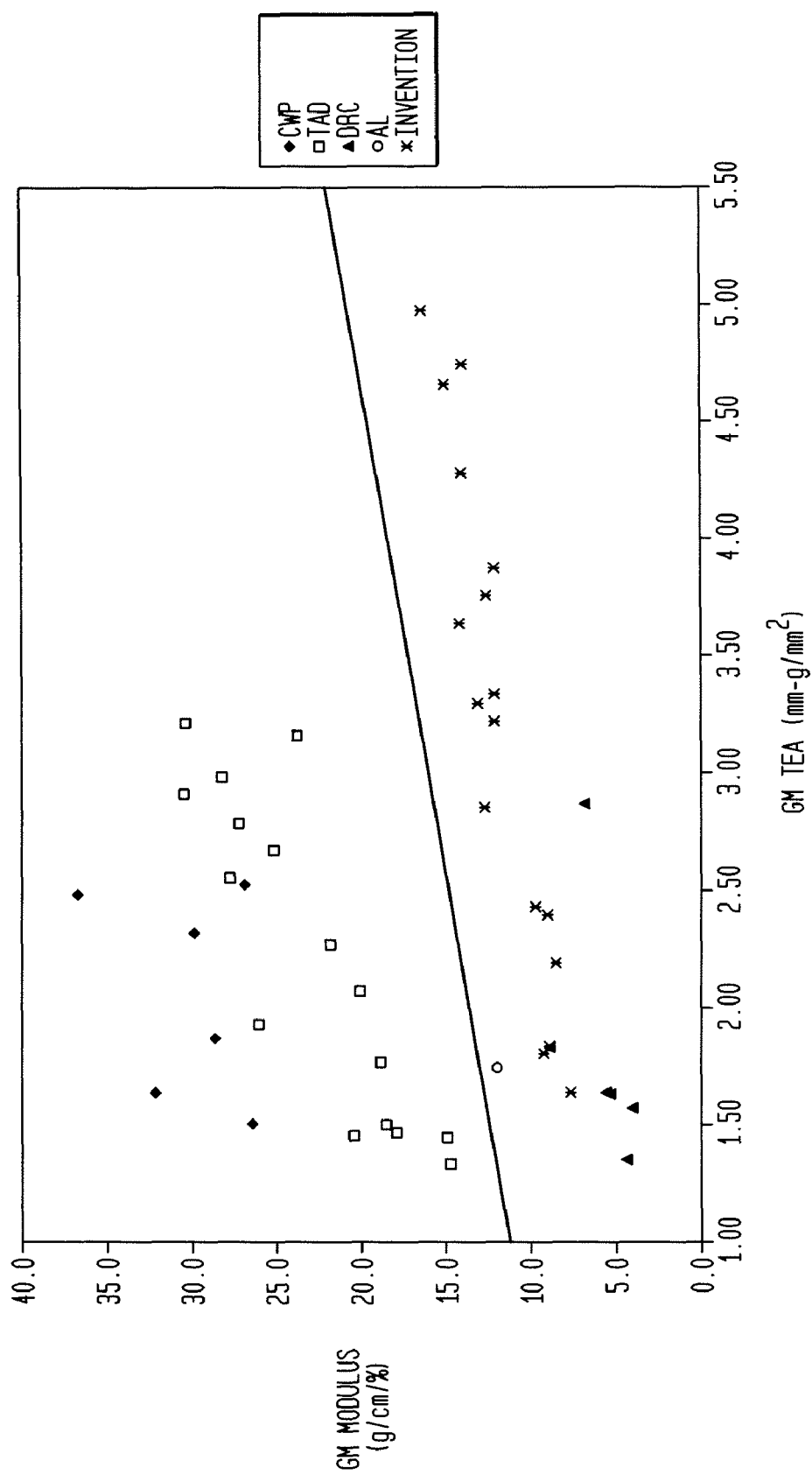

MULTI-PLY PAPER TOWEL WITH CREPED PLIES

CLAIM FOR PRIORITY

This application is based upon U.S. Provisional Application Ser. No. 60/841,346, of the same title, filed Aug. 30, 2006, the priority of which is hereby claimed and the disclosure of which is incorporated herein by reference.

TECHNICAL FIELD

The present invention relates generally to high basis weight, premium multi-ply disposable paper towels. The towels of the invention exhibit toughness (elevated TEA) and relatively low stiffness (modulus). The towels are made with less SAT converting loss than conventional towels and in many cases a converting absorbency increase is realized upon drawing an embossed and glued product.

BACKGROUND

Methods of making paper tissue, towel, and the like are well known, including various features such as Yankee drying, throughdrying, fabric creping, dry creping, wet creping and so forth. Conventional wet pressing/dry creping processes (CWP) have certain advantages over conventional through-air drying processes, including: (1) lower energy costs associated with the mechanical removal of water rather than transpiration drying with hot air; and (2) higher production speeds which are more readily achieved with processes which utilize wet pressing to form a web. On the other hand, through-air drying processing has been widely adopted for new capital investment, particularly for the production of soft, bulky, premium quality towel products.

Throughdried, creped (TAD) products and processes are disclosed in the following patents: U.S. Pat. No. 3,994,771 to Morgan, Jr. et al.; U.S. Pat. No. 4,102,737 to Morton; and U.S. Pat. No. 4,529,480 to Trokhan. The processes described in these patents comprise, very generally, forming a web on a foraminous support, thermally pre-drying the web, applying the web to a Yankee dryer with a nip defined, in part, by an impression fabric, and creping the product from the Yankee dryer. A relatively permeable web is typically required, making it difficult to employ recycle furnish at levels which may be desired. Transfer to the Yankee typically takes place at web consistencies of from about 60% to about 70%. See also, U.S. Pat. No. 6,187,137 to Druecke et al. which includes disclosure of peeling a web from a Yankee dryer. As noted in the above, throughdried products tend to exhibit enhanced bulk and softness; however, thermal dewatering with hot air tends to be energy intensive. Wet-press, dry crepe operations, wherein the webs are mechanically dewatered, are preferable from an energy perspective and are more readily applied to furnishes containing recycle fiber, which in many cases tends to form webs with less permeability than virgin fiber. Moreover, line speeds tend to be higher with wet-press operations.

A wet web may also be dried or initially dewatered by thermal means by way of impingement air drying. Suitable rotary impingement air drying equipment is described in U.S. Pat. No. 6,432,267 to Watson and U.S. Pat. No. 6,447,640 to Watson et al.

Fabric creping has been employed in connection with papermaking processes which include mechanical or compactive dewatering of the paper web as a means to influence product properties. See U.S. Pat. Nos. 4,689,119 and 4,551,199 of Weldon; 4,849,054 and 4,834,838 of Klowak; and 6,287,426 of Edwards et al. Operation of fabric creping processes has been hampered by the difficulty of effectively transferring a web of high or intermediate consistency to a dryer. Note also U.S. Pat. No. 6,350,349 to Hermans et al. which discloses wet transfer of a web from a rotating transfer surface to a fabric. Further United States patents relating to fabric creping more generally include the following: U.S. Pat. Nos. 4,834,838; 4,482,429; 4,445,638, as well as 4,440,597 to Wells et al. Newer processes including fabric-creping are described in: U.S. application Ser. No. 10/679,862, entitled "Fabric Crepe Process for Making Absorbent Sheet" which application, incorporated herein by reference, discloses particular papermachine details as well as creping techniques, equipment and properties.

Other processes for making heavyweight premium paper for absorbent sheet include air-laid (AL) processes and double-crepe (DRC) processes. These processes utilize polymeric binder for strength which makes the product difficult to recycle; and, in any event, these processes are expensive to install and operate. AL and DRC are used in single ply finished products.

While technology for making absorbent disposable paper products is highly sophisticated, it is typical to "trade" one attribute for another. For example, strength increases are achieved at the expense of other properties such as stiffness (modulus increase) which may be undesirable in a product such as a premium paper towel.

SUMMARY OF INVENTION

The present invention provides multi-ply paper towels of high toughness and strength having relatively low stiffness (modulus). The towels exhibit tensile properties equivalent to, and in many respects superior to, single-ply products such as air-laid towels or double-creped towels which are much more expensive to manufacture. Moreover, air-laid products and double-creped products incorporate substantial amounts of latex binder such that converting waste is not readily recycled, leading to still higher overall costs and disposal concerns.

There is thus provided in accordance with the present invention, a multi-ply absorbent towel made from papermaking fiber including at least a first ply and a second ply bonded together. The towel generally has a basis weight of greater than 30 pounds per 3000 ft$^2$ ream (48.8 gsm) and less than 50 pounds per 3000 ft$^2$ ream (81.4 gsm). The plies are produced or selected and adhered together such that the towel exhibits a GM TEA, mm-g/mm$^2$, of greater than [0.00125 (GM Tensile, g/3")–0.75] as well as a GM Tensile Modulus, g/in/%, less than [0.0083 (GM Tensile Strength, g/3")+15.4] {of greater than [0.00952 (GM Tensile, g/cm)–0.75] as well as a GM Tensile Modulus, g/cm/%, less than [0.0249 (GM Tensile Strength, g/cm)+6.06]}. Details of the physical properties of the inventive towels are appreciated by considering FIGS. 1-3.

FIG. 1 is a plot of GM TEA versus GM tensile, wherein it is seen that the towels of the invention exhibit very high toughness; that is, elevated TEA as compared with conventional multi-ply products (DRC and AL products shown are single ply products).

FIG. 2 is a plot of GM modulus versus GM tensile. It is appreciated from FIG. 2 that the towels of the invention, while having very high strength, also exhibit a relatively low modulus, potentially having much more cloth-like drape properties and possessing more "softness" or less "stiffness".

FIG. 3 is a plot of GM modulus versus CD wet tensile. Here again it is seen that the inventive products have a much lower modulus than other multi-ply products with comparable wet strength.

In another aspect of the invention there is provided a method of making a multi-ply paper towel comprising the sequential steps of: (a) embossing a plurality of base sheets; (b) adhering the embossed base sheets together to form a multi-ply embossed towel; and (c) drawing the embossed towel along its machine direction. The base sheets are selected or produced and the steps of embossing, adhering and drawing are controlled such that the drawn towel has a basis weight of greater than 30 pounds/3000 ft$^2$ ream (48.8 gsm) and the towel has an SAT converting loss of less than 15 percent. In some embodiments, only one of the sheets is embossed.

Still further features and advantages of the present invention will become apparent from the discussion which follows.

BRIEF DESCRIPTION OF DRAWINGS

The invention is described in detail below in connection with numerous examples and the figures. Plots reflecting the corresponding metric data are present in the supplementary "a" Figures. In the Figures:

FIG. 1 is a plot of GM TEA vs. GM Tensile (g/3") for various products of the invention and various prior art products;

FIG. 1a is a plot of GM TEA vs. GM Tensile (g/cm) for various products of the invention and various prior art products;

FIG. 2 is a plot of GM Modulus (g/in/%) vs. GM Tensile (g/3") for various products of the invention and various prior art products;

FIG. 2a is a plot of GM Modulus (g/cm/%) vs. GM Tensile (g/cm) for various products of the invention and various prior art products;

FIG. 3 is a plot of GM Modulus (g/in/%) vs. CD Wet Tensile (g/3") for various products of the invention and various prior art products;

FIG. 3a is a plot of GM Modulus (g/cm/%) vs. CD Wet Tensile (g/cm) for various products of the invention and various prior art products;

FIG. 10 is a schematic diagram of an embossing and plying process which may be employed to make a three-ply towel of the present invention;

FIG. 11 is a plot of CD TEA vs. MD TEA for various products of the present invention and various prior art products;

FIG. 12 is a plot of GM Break Modulus (g/3"/%) vs. GM Tensile (g/3") for various products of the invention and various prior art products;

FIG. 12a is a plot of GM Break Modulus (g/cm/%) vs. GM Tensile (g/cm) for various products of the invention and various prior art products;

Figure 13:
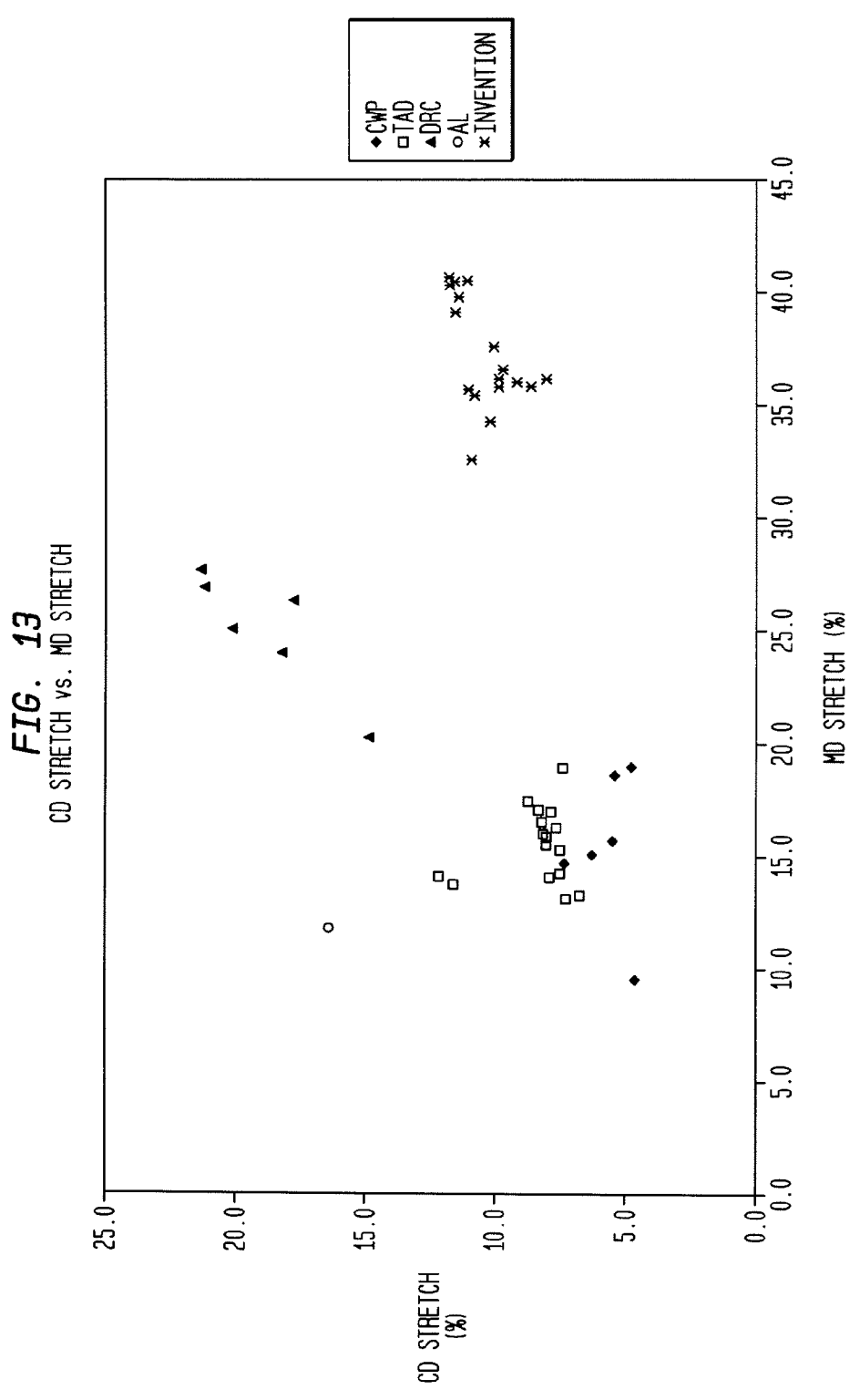

FIG. 13 is a plot of CD Stretch vs. MD stretch for various products of the invention and various prior art products;

FIG. 14 is a plot of GM Break Modulus (g/3"/%) vs. CD Wet Tensile (g/3") for various products of the invention and various prior art products;

FIG. 14a is a plot of GM Break Modulus (g/cm/%) vs. CD Wet Tensile (g/cm) for various products of the invention and various prior art products;

FIG. 15 is a plot of SAT Converting Loss vs. Base Sheet MD Stretch for various base sheets;

FIG. 16a is a plot of MD Bending Length vs. MD Tensile (g/cm) for various products of the invention and various prior art products;

FIG. 17 is a plot of GM Stretch vs. GM Tensile (g/3") for various products of the invention and various prior art products; and FIG. 17a is a plot of GM Stretch vs. GM Tensile (g/cm) for various products of the invention and various prior art products;

FIG. 18 is a plot of GM Modulus (g/in/%) vs. GM TEA for various products of the invention and various prior art products; and FIG. 18a is a plot of GM Modulus (g/cm/%) vs. GM TEA for various products of the invention and various prior art products.

DETAILED DESCRIPTION

Figure 4:
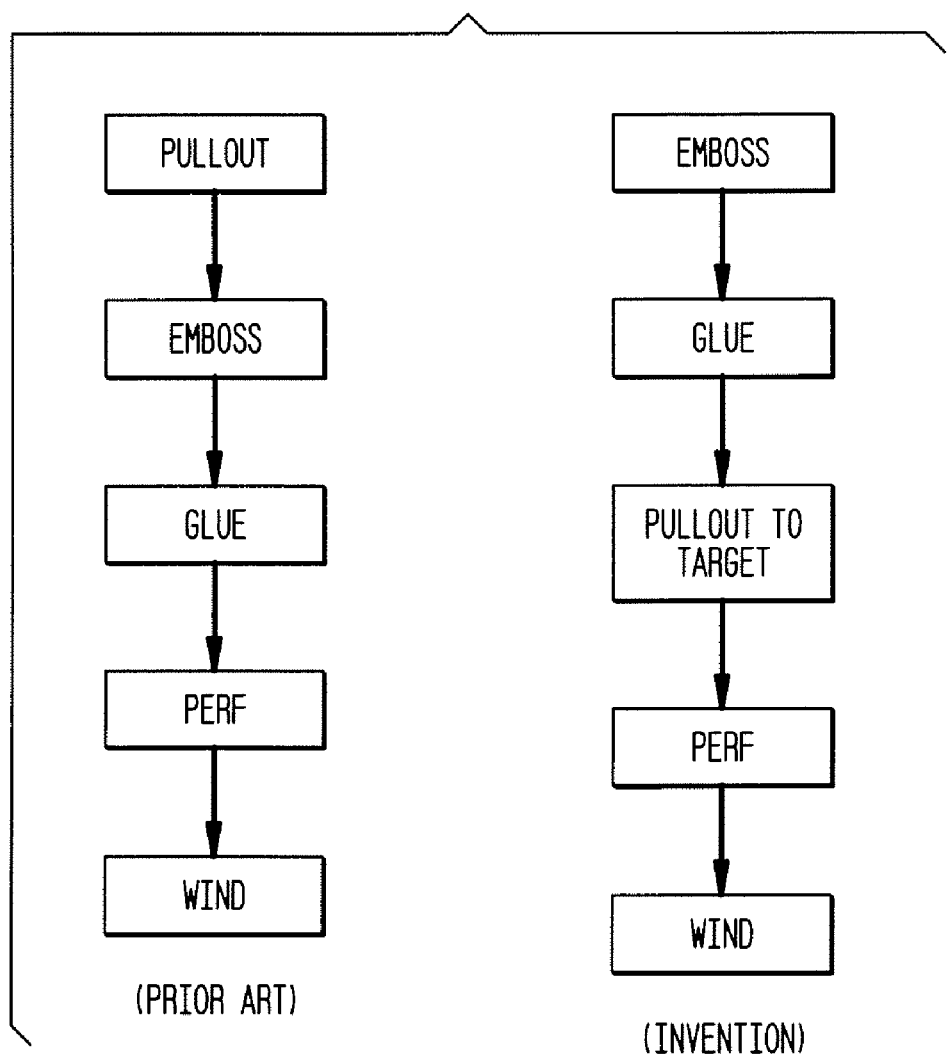
FIG. 4 is a flow diagram comparing a prior art converting process with the converting process of the present invention.

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art.

Generally, the multi-ply absorbent towel of the invention has a basis weight of greater than 30 pounds/3000 ft$^2$ ream (48.8 gsm). The towel may have, for example, a basis weight of greater than 35 pounds/3000 ft$^2$ ream (57.0 gsm); or in some cases a basis weight of between 32 pounds/3000 ft$^2$ ream (52.1 gsm) and 45 pounds/3000 ft$^2$ ream (73.2 gsm). The towel may be a two or three-ply paper towel typically embossed with either a nested embossed structure or a point to point embossed structure. The multi-ply absorbent towel may have an SAT value of between 5 g/g and 12 g/g; and preferably an SAT value of greater than 7.5 g/g. In many cases the plies are selected and adhered together such that the towel exhibits a CD TEA of between 1.7 mm-g/mm$^2$ and 3 mm-g/mm$^2$ and a MD TEA of between 6 mm-g/mm$^2$ and 10 mm-g/mm$^2$. The plies are typically selected and adhered together such that the towel exhibits a GM Tensile Modulus, g/in/%, less than [0.0083 (GM Tensile Strength, g/3")+15.4] and a GM Tensile Modulus, g/in/%, less than [0.0325 (CD Wet Tensile Strength, g/3")+14.5], as well as GM Break Modulus, g/3"/% of less than [0.053 (GM Tensile Strength, g/3")+33.3] {a GM Tensile Modulus, g/cm/%, less than [0.0249 (GM Tensile Strength, g/cm)+6.06] and a GM Tensile Modulus, g/cm/%, less than [0.0975 (CD Wet Tensile Strength, g/cm)+5.71], as well as GM Break Modulus, g/cm/% of less than

[0.053 (GM Tensile Strength, g/cm)+4.37]}. So also, the towel typically exhibits a GM Break Modulus, g/3"/% of less than [0.175 (CD Wet Tensile, g/3")+45] and a GM Modulus, g/in/% of less than [6 (GM TEA, mm-g/mm$^2$)+22] {a GM Break Modulus, g/cm/% of less than [0.175 (CD Wet Tensile, g/cm)+5.91] and a GM Modulus, g/cm/% of less than [2.36 (GM TEA, mm-g/mm$^2$)+8.66]}.

Generally the towel exhibits an MD bending length of less than 4.5 or 4.25 cm and a MD Tensile Strength of less than about 4000 g/3" (525.0 g/cm); typically the towel exhibits an MD bending length of between 3 and 4 cm. The towel may have a GM TEA value of greater than 3.5 mm-g/mm$^2$ such as a value of greater than 4 mm-g/mm$^2$. In some cases the towel may consist of a single embossed ply and backing ply and have a CD TEA of between 1.75 mm-g/mm$^2$ and 3 mm-g/mm$^2$ and an MD TEA of between 6 mm-g/mm$^2$ and 10 mm-g/mm$^2$ and/or a GM TEA of greater than 3.5 mm-g/mm$^2$.

In preferred embodiments, the towels are prepared from base sheets which are made by way of (i) compactively dewatering a papermaking furnish to form a nascent web; (ii) applying the dewatered web to a translating transfer surface; (iii) fabric creping the web from a transfer surface; and (iv) drying the web to form base sheets. The base sheets are embossed and plied as described hereinafter to produce the products of the invention. As one of skill in the art will appreciate upon consideration of the detailed description which follows, base sheets may be prepared by any other suitable means upon selection of the appropriate fiber, materials, processing parameters and so forth, especially furnish selection and preparation, fabric crepe, overall crepe and fabrics employed in the papermaking process.

The unique tensile properties of the towels of the invention are surprising given the substantial absence of binder resin in typical products (usually none and optionally less than 0.5% or up to 1-2% by weight) and the fact that the towels usually consist essentially (99.5%+) of cellulosic papermaking fiber. The towels of the invention are soft, yet have high strength and toughness, characteristics which are seen in single-ply air-laid or double creped products with substantial amounts of binder resin (latex).

It has been discovered, quite surprisingly, that high basis weight, multi-ply paper towels made from throughdried or fabric-creped base sheets can be drawn in the MD such that absorbency properties can be maintained or even increased. Without intending to be bound by theory, this attribute may be due to the more uniform pullout after embossing and gluing. This feature of the invention allows for greater papermachine efficiency, especially higher basis weights, while maintaining desired basis weights in the finished products.

Conventional wisdom is that as a base sheet is pulled out, the SAT absorbency levels decrease, approximately linearly, with the amount of pullout. So when the high basis weight towels of the invention were drawn and absorbency did not decrease, it is likely that pulling out the internal structure of the sheet "opens" the structure sufficiently to overcome the decrease in basis weight.

Conventionally, converting takes place generally in the following order: Pullout→Emboss→Glue→Perf→Wind. To take full advantage of the findings of this invention this operational order needs to change to something like: Unwind as slack as possible→Emboss→Glue→Pullout to target weight→Perf→Wind. See FIG. 4. In this manner, heavier weight sheets can be made on the papermachine, increasing its efficiency and raising the SAT absorbency levels. More tons can be produced at a given speed level and the machine can be run closer to the drying limit rather than the speed limit. This is especially advantageous in connection with the fabric-crepe process described hereinafter, where high levels of fabric crepe are often required. Clearly, pulling these sheets out within the scope of this invention will reduce the CD tensile levels (along with wet CD tensile levels), therefore base sheets with low MD/CD tensile ratios are desired. The fabric-crepe process is especially suitable for producing these types of base sheets with MD/CD tensile ratios as low as 0.4. When these sheets are pulled out in converting, the finished product tensile ratios will end up at the desired "square" for optimum towel performance.

The technology used to produce the base sheets has an effect on the degree to which this pullout effect is realized. For example, TAD sheets generally have much less MD stretch than do fabric-creped sheets, but even within this low stretch regime basis weights for some TAD sheets can be reduced by about 5-10% by pulling out some of this stretch without reducing the absorbency. Since absorbency and caliper are closely related, this basis weight reduction does not necessarily come with the concurrent reduction in caliper either, so roll properties can be maintained in converting. However, tensiles will decrease in the CD much faster than the MD. Also, with reduced MD stretch the stiffness of the towel in the MD direction may increase noticeably but may be partially offset by the enhanced void volume of the sheet and the reduction in CD tensile. While the basis weight reduction is easily seen as a main economic advantage of this process, a significant advantage lies in the fact that at a given basis weight absorbency levels greater than normally seen are achievable.

Without intending to be bound by theory, it is believed that in connection with the fabric-creped products, this increase is caused by the fact that during the pulling out step, the "folded" areas that occur during the fabric creping process are pulled out rather than the "creped" areas of the sheet which pull out when the base sheets are drawn or pulled. This is similar, in some respects, to the effect seen in US Patent Publication 2005/0217814A1, the disclosure of which is incorporated herein by reference in its entirety. It is believed that this improved pullout occurs because the ply-gluing step randomly attaches the two sheets together, so that when the sheet is pulled a significant number of these "creped" areas are glued to the other sheet so the areas between the creped areas tend to get pulled out. As is shown in the 2005/0217814A1 publication, pulling out these areas increases the void volume and specific absorbency of the base sheets. Since the TAD sheets are also creped this same effect is observed but to a degree that permits basis weight reduction with no concurrent decrease in absorbency.

The products made by way of the inventive sequential process of embossing/adhering/drawing generally have an SAT converting loss of less than 15%, preferably less than 10 percent. An SAT converting loss of less than 5 percent is still more preferred; and most preferably the drawn towel has an SAT converting gain over the base sheets from which it is made. A gain of at least 2 percent is especially preferred. The embossed/glued towel may be drawn along its machine direction at least about 5 percent, 10 percent, 15 percent, 20 percent, or more. The base sheet used in the inventive embossing/plying/drawing process may be a throughdried web or a fabric-creped web as noted above.

In some preferred embodiments the base sheet has an MD/CD dry tensile ratio of less than 1 or in some cases of less than 0.5.

In especially preferred cases the base sheet from which the multi-ply towels of the invention are made has an MD stretch at break of at least 20 percent. An MD stretch of 30 percent, 45 percent, 60 percent or more is readily achieved in accordance with the present invention, wherein base sheets having an MD stretch greater than 20 percent and less than 70 percent are readily employed. The invention is further described in connection with the examples which follow hereinafter and the general description of tests methods and materials provided immediately below.

Terminology used herein is given its ordinary meaning with the exemplary definitions set forth immediately below. Test specimens are conditioned for 2 hours at 50% relative humidity and 23° C.±1° C. (73.4° F.±1.8° F.) unless otherwise indicated.

Absorbency of the inventive products (SAT) is measured with a simple absorbency tester. The simple absorbency tester is a particularly useful apparatus for measuring the hydrophilicity and absorbency properties of a sample of tissue, napkins, or towel. In this test a sample of tissue, napkins, or towel 2.0 inches (5.08 cm) in diameter is mounted between a top flat plastic cover and a bottom grooved sample plate. The tissue, napkin, or towel sample disc is held in place by a ⅛ inch (0.32 cm) wide circumference flange area. The sample is not compressed by the holder. De-ionized water at 73° F. (22.8° C.) is introduced to the sample at the center of the bottom sample plate through a 1 mm. diameter conduit. This water is at a hydrostatic head of minus 5 mm. Flow is initiated by a pulse introduced at the start of the measurement by the instrument mechanism. Water is thus imbibed by the tissue, napkin, or towel sample from this central entrance point radially outward by capillary action. When the rate of water imbibation decreases below 0.005 gm water per 5 seconds, the test is terminated. The amount of water removed from the reservoir and absorbed by the sample is weighed and reported as grams of water per gram of sample or per square meter of sample. Absorbed $g/m^2$ are used for purposes of calculating SAT converting loss. When testing base sheet for multiply towel, the number of plies used in the towel are tested. For example, 2 plies of base sheet are stacked and tested, then compared with 2-ply finished product made from the base sheet for purposes of determining SAT converting loss. In practice, an M/K Systems Inc. Gravimetric Absorbency Testing System is used. This is a commercial system obtainable from M/K Systems Inc., 12 Garden Street, Danvers, Mass. 01923. WAC, or water absorbent capacity, also referred to as SAT, is actually determined by the instrument itself. WAC is defined as the point where the weight versus time graph has a "zero" slope, i.e., the sample has stopped absorbing. The termination criteria for a test are expressed in maximum change in water weight absorbed over a fixed time period. This is basically an estimate of zero slope on the weight versus time graph. The program uses a change of 0.005 g over a 5 second time interval as termination criteria; unless "Slow SAT" is specified in which case the cut off criteria is 1 mg in 20 seconds.

Throughout this specification and claims, when we refer to a nascent web having an apparently random distribution of fiber orientation (or use like terminology), we are referring to the distribution of fiber orientation that results when known forming techniques are used for depositing a furnish on the forming fabric. When examined microscopically, the fibers give the appearance of being randomly oriented even though, depending on the jet to wire speed, there may be a significant bias toward machine direction orientation, making the machine direction tensile strength of the web exceed the cross-direction tensile strength.

Unless otherwise specified, "basis weight", BWT, bwt, and so forth refers to the weight of a 3000 $ft^2$ ream (278.7 $m^2$) of product. Consistency refers to percent solids of a nascent web, for example, calculated on a bone dry basis. "Air dry" means including residual moisture, by convention up to about 10 percent moisture for pulp and up to about 6% for paper. A nascent web having 50 percent water and 50 percent bone dry pulp has a consistency of 50 percent.

"Base sheet" refers to a unitary cellulosic sheet as manufactured by a papermachine. Base sheets may be layered; however, they have a unitary structure not readily delaminated. A "ply" of a finished product refers to base sheet incorporated into the product.

MD bending length (cm) is determined in accordance with ASTM test method D 1388-96, cantilever option. Reported bending lengths refer to MD bending lengths unless a CD bending length is expressly specified. The MD bending length test was performed with a Cantilever Bending Tester available from Research Dimensions, 1720 Oakridge Road, Neenah, Wis. 54956, which is substantially the apparatus shown in the ASTM test method, item 6. The instrument is placed on a level, stable surface, horizontal position being confirmed by a built in leveling bubble. The bend angle indicator is set at 41.5° below the level of the sample table. This is accomplished by setting the knife edge appropriately. The sample is cut with a one inch JD strip cutter available from Thwing-Albert Instrument Company, 14 Collins Avenue, W. Berlin, N.J. 08091. Six (6) samples are cut into 1 inch×8 inch (2.54 cm×20.32 cm) machine direction specimens. Samples are conditioned at 23° C.±1° C. (73.4° F.±1.8° F.) at 50% relative humidity for at least two hours. For machine direction specimens the longer dimension is parallel to the machine direction. The specimens should be flat, free of wrinkles, bends or tears. The Yankee side of the specimens are also labeled. The specimen is placed on the horizontal platform of the tester, aligning the edge of the specimen with the right hand edge. The movable slide is placed on the specimen, being careful not to change its initial position. The right edge of the sample and the movable slide should be set at the right edge of the horizontal platform. The movable slide is displaced to the right in a smooth, slow manner at approximately 5 inch/minute (12.7 cm/min) until the specimen touches the knife edge. The overhang length is recorded to the nearest 0.1 cm. This is done by reading the left edge of the movable slide. Three specimens are preferably run with the Yankee side up and three specimens are preferably run with the Yankee side down on the horizontal platform. The MD bending length is reported as the average overhang length in centimeters divided by two to account for bending axis location.

The term "cellulosic", "cellulosic sheet" and the like is meant to include any product incorporating fiber having cellulose as a major constituent. "Papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; wood fibers such as those obtained from deciduous and coniferous trees, including softwood fibers, such as northern and southern softwood kraft fibers; and hardwood fibers, such as eucalyptus, maple, birch, aspen, or the like. Papermaking fibers can be liberated from their source material by any one of a number of chemical pulping processes familiar to one experienced in the art, including sulfate, sulfite, polysulfide, soda pulping, etc. The pulp can be bleached if desired by chemical means including the use of chlorine, chlorine dioxide, oxygen and so forth. The products of the present invention may comprise a blend of conventional fibers (whether derived from virgin pulp or recycle sources) and high coarseness lignin-rich tubular fibers, such as bleached chemical thermomechanical pulp (BCTMP). "Furnishes" and like terminology refers to aqueous compositions including papermaking fibers, wet strength resins, debonders, and the like for making paper products. Synthetic fibers may also be included in the furnish.

As used herein, the "compactively dewatering the web or furnish" refers to mechanical dewatering by wet pressing on a dewatering felt, for example, in some embodiments by use of mechanical pressure applied continuously over the web surface, as in a nip between a press roll and a press shoe wherein the web is in contact with a papermaking felt. The terminology "compactively dewatering" is used to distinguish processes wherein the initial dewatering of the web is carried out largely by thermal means as is the case, for example, in U.S. Pat. No. 4,529,480 to Trokhan and U.S. Pat. No. 5,607,551 to Farrington et al. noted above. Compactively dewatering a web thus refers, for example, to removing water from a nascent web having a consistency of less than 30 percent or so by application of pressure thereto and/or increasing the consistency of the web by about 15 percent or more by application of pressure thereto.

"Converting loss", "SAT converting loss" and like terminology refers to the loss of absorbency seen when converting base sheet to a finished product. The SAT converting loss in percent is calculated as follows:

$$\left(\frac{SAT \text{ of } N \text{ ply Base Sheet} - SAT \text{ of } N \text{ ply } FP}{SAT \text{ of } N \text{ ply Base Sheet}}\right) \times 100$$

SAT values in $g/m^2$ are used. See Examples below and FIG. 15.

Figure 5:
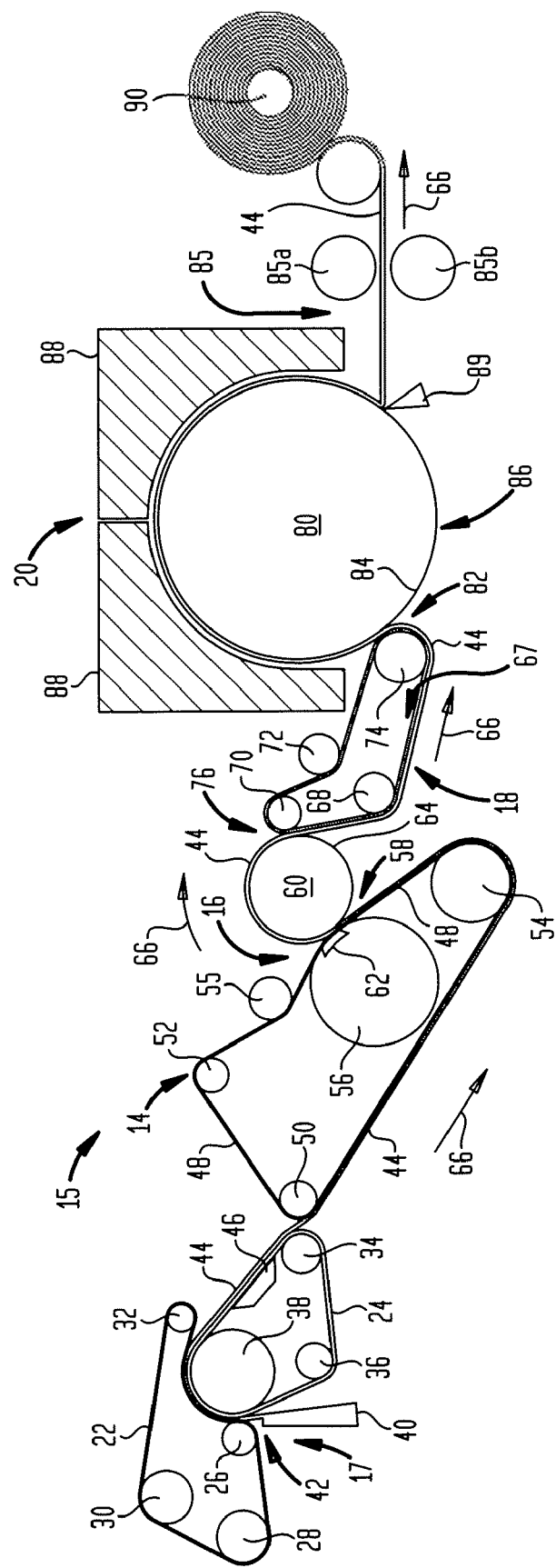
FIG. 5 is a schematic diagram of a papermachine useful for making base sheet employed in connection with the present invention.

The draw ratio is calculated as the ratio of winding speed to the creping fabric speed when making base sheet using a papermachine of the class shown in FIG. 5. Draw may be expressed as a percentage by subtracting 1 from the draw ratio and multiply by 100%. The "pullout" or "draw" applied to a test specimen is calculated from the ratio of final length (MD) divided by its length prior to MD elongation. Unless otherwise specified, draw refers to elongation with respect to the length of the as-dried web. This quantity may also be expressed as a percentage. For example a 4" test specimen drawn to 5" has a draw ratio of 5/4 or 1.25 and a draw of 25%.

"Fabric side" and like terminology refers to the side of the web which is in contact with the creping and drying fabric. "Dryer side" or the like is the side of the web opposite the fabric side of the web.

"FC" means a fabric crepe process of the class discussed in detail in connection with FIG. 5 or a product produced by that technology as the context indicates. "TAD" on the other hand, refers to products which are throughdried.

"FP" means finished product.

"Fpm" refers to feet per minute ("mpm" refers to meters per minute) while "consistency" refers to the weight percent fiber of the web.

"Jet/wire velocity delta" is the difference in speed between the headbox jet issuing from a headbox and the framing wire or fabric speed in the MD; jet velocity-wire velocity delta is typically expressed in fpm. In cases where a pair of forming fabrics are used, the speed of the fabric advancing the web in the machine direction is used to calculate jet/wire velocity delta.

"MD" means machine direction and "CD" means cross-machine direction.

Nip parameters include, without limitation, nip pressure, nip width, backing roll hardness, fabric approach angle, fabric takeaway angle, uniformity, nip penetration and velocity delta between surfaces of the nip.

"Nip width" means the MD length over which the nip surfaces are in contact.

"On line" and like terminology refers to a process step performed without removing the web from the papermachine in which the web is produced. A web is drawn or calendered on line when it is drawn or calendered without being severed prior to wind-up.

Figure 7:
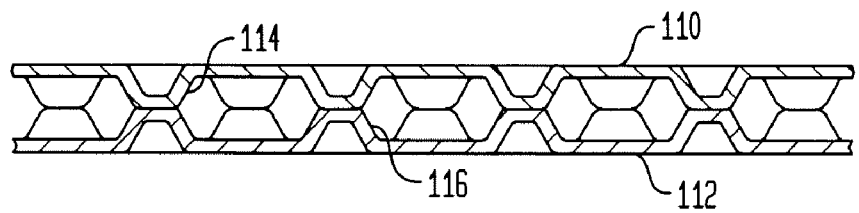
FIG. 7 is a diagram of a multi-ply towel having a point-to-point embossed structure.

A "point-to-point" embossed structure is one where embossments on different plies are aligned and adhered to each other as shown generally in FIG. 7. A nested embossed structure is a structure wherein embossments on different plies are staggered with respect to each other as shown generally in FIG. 8.

"Predominantly" means more than 50% by weight of the named species unless mole percent is specified. Papermaking fiber from which a product is made is "predominantly" softwood fiber if over 50% by weight of fiber in the product is softwood fiber (bone dry).

A translating transfer surface refers to the surface from which the web is creped into the creping fabric. The translating transfer surface may be the surface of a rotating drum as described hereafter, or may be the surface of a continuous smooth moving belt or another moving fabric which may have surface texture and so forth. The translating transfer surface needs to support the web and facilitate the high solids creping as will be appreciated from the discussion which follows.

Calipers and/or bulk reported herein may be 1, 4 or 8 sheet calipers. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in./sec (0.587 cm/sec) descent rate. For finished product testing, each sheet of product to be tested must have the same number of plies as the product is sold. For testing in general, eight sheets are selected and stacked together. For napkin testing, napkins are enfolded prior to stacking. For base sheet testing off of winders, each sheet to be tested must have the same number of plies as produced off the winder. For base sheet testing off of the papermachine reel, single plies must be used. Sheets are stacked together aligned in the MD. On printed product, try to avoid taking measurements in these areas if at all possible. Bulk may also be expressed in units of volume/weight by dividing caliper by basis weight.

Dry tensile strengths (MD and CD), stretch, ratios thereof, break modulus, stress and strain are measured with a standard Instron test device or other suitable elongation tensile tester which may be configured in various ways, typically using 3 or 1 inch (7.62 or 2.54 cm) (wide strips of tissue or towel, conditioned for 2 hours at 50% relative humidity and 23° C.±1° C. (73.4° F.±1.8° F.), with the tensile test run at a crosshead speed of 2 in/min (5.08 cm/min).

Unless otherwise specified, a tensile property is a "dry" property at break (i.e., peak value), except for modulus, which refers to the "initial" modulus as noted below.

Tensile ratios are simply ratios of the values determined by way of the foregoing methods. Tensile ratio refers to the MD/CD dry tensile ratio unless otherwise stated. Tensile strength is sometimes referred to simply as "tensile".

TEA is a measure of strength and is reported CD TEA, MD TEA, or GM TEA. Total energy absorbed (TEA) is calculated as the area under the stress-strain curve using a tensile tester as has been previously described above. The area is based on the strain value reached when the sheet is strained to rupture and the load placed on the sheet has dropped to 65 percent of the peak tensile load. Since the thickness of a paper sheet is generally unknown and varies during the test, it is common practice to ignore the cross-sectional area of the sheet and report the "stress" on the sheet as a load per unit, or typically in the units of grams per 3 inches of width. For the TEA calculation, the stress is converted to grams per millimeter and the area calculated by integration. The units of strain are millimeters per millimeter so that the final TEA units become mm-g/mm$^2$ or simply g/mm.

The modulus of a product (also referred to as stiffness modulus or tensile modulus) is determined by the procedure for measuring tensile strength described above, using a finished product sample with a width of 1 inch, and the modulus recorded is the chord slope of the load/elongation curve measured over the range of 0-100 grams load for towel. That is, modulus is the load at 100 g/stretch at 100 g. For tissue, 50 g values are used. Modulus is reported in g/in/% (g/cm/%).

"Break Modulus" is the stress at break divided by the elongation at break, tested on a 3" (7.62 cm) wide sample; these values are appreciably higher than the modulus at 0-100 grams load as will be appreciated from the various Figures. Break Modulus is reported in g/3"/% (g/cm/%).

The wet tensile of the tissue of the present invention is measured using a three-inch wide strip of tissue that is folded into a loop, clamped in a special fixture termed a Finch Cup, then immersed in water. The Finch Cup, which is available from the Thwing-Albert Instrument Company of Philadelphia, Pa., is mounted onto a tensile tester equipped with a 2.0 pound load cell with the flange of the Finch Cup clamped by the tester's lower jaw and the ends of tissue loop clamped into the upper jaw of the tensile tester. The sample is immersed in water that has been adjusted to a pH of 7.0+ or −0.1 and the tensile is tested after a 5 second immersion time. The results are expressed in g/3" (g/cm), dividing by two to account for the loop as appropriate.

A "GM" value is the square root of the product of the CD and MD values.

GM Break Modulus is thus:

[(MD tensile/MD Stretch at break)×(CD tensile/CD Stretch at break)]$^{1/2}$

"Fabric crepe ratio" is an expression of the speed differential between the creping fabric and the forming wire, and typically calculated as the ratio of the web speed immediately before creping and the web speed immediately following creping, because the forming wire and transfer surface are typically, but not necessarily, operated at the same speed:

Fabric crepe ratio=transfer cylinder speed÷creping fabric speed

Fabric crepe can also be expressed as a percentage calculated as:

Fabric crepe percent=Fabric crepe ratio−1×100%

Line crepe (sometimes referred to as overall crepe), reel crepe and so forth are similarly calculated as discussed below.

PLI or pli means pounds force per linear inch (kg force per linear centimeter (kglcm)).

Pusey and Jones (P+J) hardness (indentation), sometimes referred to simply as P+J, is measured in accordance with ASTM D 531, and refers to the indentation number (standard specimen and conditions).

Velocity delta means a difference in linear speed.

According to the present invention, an absorbent paper web is made by dispersing papermaking fibers into an aqueous furnish (slurry) and depositing the aqueous furnish onto the forming wire of a papermaking machine, typically by way of a jet issuing from a headbox. Any suitable forming scheme might be used. For example, an extensive but non-exhaustive list in addition to Fourdrinier formers includes a crescent former, a C-wrap twin wire former, an S-wrap twin wire former, or a suction breast roll former. The forming fabric can be any suitable foraminous member, including single layer fabrics, double layer fabrics, triple layer fabrics, photopolymer fabrics, and the like. Non-exhaustive background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808 all of which are incorporated herein by reference in their entirety. One forming fabric particularly useful with the present invention is Voith Fabrics Forming Fabric 2164 made by Voith Fabrics Corporation, Shreveport, La.

The furnish may contain chemical additives to alter the physical properties of the paper produced. These chemistries are well understood by the skilled artisan and may be used in any known combination. Such additives may be surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof; said chemicals optionally comprising polyols, starches, PPG esters, PEG esters, phospholipids, surfactants, polyamines, HMCP or the like.

The pulp can be mixed with strength adjusting agents such as wet strength agents, dry strength agents, debonders/softeners, and so forth. Suitable wet strength agents are known to the skilled artisan. A comprehensive but non-exhaustive list of useful strength aids include urea-formaldehyde resins, melamine formaldehyde resins, glyoxylated polyacrylamide resins, polyamide-epichlorohydrin resins and the like. Thermosetting polyacrylamides are produced by reacting acrylamide with diallyl dimethyl ammonium chloride (DADMAC) to produce a cationic polyacrylamide copolymer, which is ultimately reacted with glyoxal to produce a cationic cross-linking wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference in their entirety. Resins of this type are commercially available under the trade name of PAREZ 631NC by Bayer Corporation. Different mole ratios of acrylamide/DADMAC/glyoxal can be used to produce cross-linking resins, which are useful as wet strength agents. Furthermore, other dialdehydes can be substituted for glyoxal to produce thermosetting wet strength characteristics. Of particular utility are the polyamide-epichlorohydrin wet strength resins, an example of which is sold under the trade names Kymene 557LX and Kymene 557H by Hercules Incorporated of Wilmington, Del. and Amres® from Georgia-Pacific Resins, Inc. These resins and the process for making the resins are described in U.S. Pat. No. 3,700,623 and U.S. Pat. No. 3,772,076 each of which is incorporated herein by reference in its entirety. An extensive description of polymeric-epihalohydrin resins is given in Chapter 2: *Alkaline-Curing Polymeric Amine-Epichlorohydrin* by Espy in *Wet Strength Resins and Their Application* (L. Chan, Editor, 1994), herein incorporated by reference in its entirety. A reasonably comprehensive list of wet strength resins is described by Westfelt in *Cellulose*

*Chemistry and Technology* Volume 13, p. 813, 1979, which is incorporated herein by reference.

Suitable dry strength agents include starch, guar gum, polyacrylamides, carboxymethyl cellulose and the like. Of particular utility is carboxymethyl cellulose, an example of which is sold under the trade name Hercules CMC, by Hercules Incorporated of Wilmington, Del. According to one embodiment, the pulp may contain from about 0 to about 15 lb/ton (7.5 kg/mton) of dry strength agent. According to another embodiment, the pulp may contain from about 1 to about 5 lbs/ton (from about 0.5 to about 2.5 kg/mton) of dry strength agent.

The nascent web is typically dewatered on a papermaking felt. Any suitable felt may be used. For example, felts can have double-layer base weaves, triple-layer base weaves, or laminated base weaves. Preferred felts are those having the laminated base weave design. A wet-press-felt which may be particularly useful with the present invention is Vector 3 made by Voith Fabric. Background art in the press felt area includes U.S. Pat. Nos. 5,657,797; 5,368,696; 4,973,512; 5,023,132; 5,225,269; 5,182,164; 5,372,876; and 5,618,612. A differential pressing felt as is disclosed in U.S. Pat. No. 4,533,437 to Curran et al. may likewise be utilized.

Suitable creping or textured fabrics include single layer or multi-layer, or composite preferably open meshed structures. Fabric construction per se is of less importance than the topography of the creping surface in the creping nip as discussed in more detail below. Long MD knuckles with slightly lowered CD knuckles are greatly preferred for some products. Fabrics may have at least one of the following characteristics: (1) on the side of the creping fabric that is in contact with the wet web (the "top" side), the number of machine direction (MD) strands per inch (strands per 2.54 cm) (mesh) is from 10 to 200 and the number of cross-direction (CD) strands per inch (strands per 2.54 cm) (count) is also from 10 to 200; (2) the strand diameter is typically smaller than 0.050 inch (0.13 cm); (3) on the top side, the distance between the highest point of the MD knuckles and the highest point on the CD knuckles is from about 0.001 to about 0.02 or 0.03 inch (from about 0.0025 to about 0.05 to about 0.076 cm); (4) in between these two levels there can be knuckles formed either by MD or CD strands that give the topography a three dimensional hill/valley appearance which is imparted to the sheet; (5) the fabric may be oriented in any suitable way so as to achieve the desired effect on processing and on properties in the product; the long warp knuckles may be on the top side to increase MD ridges in the product, or the long shute knuckles may be on the top side if more CD ridges are desired to influence creping characteristics as the web is transferred from the transfer cylinder to the creping fabric; and (6) the fabric may be made to show certain geometric patterns that are pleasing to the eye, which is typically repeated between every two to 50 warp yarns. One preferred fabric is a W013 Albany International multilayer fabric. Such fabrics are formed from monofilament polymeric fibers having diameters typically ranging from about 0.25 mm to about 1 mm. Such fabrics are formed from monofilament polymeric fibers having diameters typically ranging from about 10 mm to about 100 mm. This fabric may be used to produce an absorbent cellulosic sheet having variable local basis weight comprising a papermaking fiber reticulum provided with (i) a plurality of cross-machine direction (CD) extending, fiber-enriched pileated regions of relatively high local basis weight interconnected by (ii) a plurality of elongated densified regions of compressed papermaking fibers, the elongated densified regions having relatively low local basis weight and are generally oriented along the machine direction (MD) of the sheet. The elongated densified regions are further characterized by an MD/CD aspect ratio of at least 1.5. Typically, the MD/CD aspect ratios of the densified regions are greater than 2 or greater than 3; generally between about 2 and 10. In most cases the fiber-enriched, pileated regions have fiber orientation bias along the CD of the sheet and the densified regions of relatively low basis weight extend in the machine direction and also have fiber orientation bias along the CD of the sheet. This product is further described in copending application U.S. patent application Ser. No. 11/804,246, filed May 16, 2007, entitled "Fabric Creped Absorbent Sheet with Variable Local Basis Weight", the disclosure of which is incorporated herein in its entirety by reference.

The creping fabric may be of the class described in U.S. Pat. No. 5,607,551 to Farrington et al., Cols. 7-8 thereof, as well as the fabrics described in U.S. Pat. No. 4,239,065 to Trokhan and U.S. Pat. No. 3,974,025 to Ayers. Such fabrics may have about 20 to about 60 meshes per inch and are formed from monofilament polymeric fibers having diameters typically ranging from about 0.008 to about 0.025 inches (from about 0.020 to about 0.064 cm). Both warp and weft monofilaments may, but need not necessarily be of the same diameter.

In some cases the filaments are so woven and complimentarily serpentinely configured in at least the Z-direction (the thickness of the fabric) to provide a first grouping or array of coplanar top-surface-plane crossovers of both sets of filaments; and a predetermined second grouping or array of sub-top-surface crossovers. The arrays are interspersed so that portions of the top-surface-plane crossovers define an array of wicker-basket-like cavities in the top surface of the fabric, which cavities are disposed in staggered relation in both the machine direction (MD) and the cross-machine direction (CD), and so that each cavity spans at least one sub-top-surface crossover. The cavities are discretely perimetrically enclosed in the plan view by a picket-like-alignment comprising portions of a plurality of the top-surface plane crossovers. The loop of fabric may comprise heat set monofilaments of thermoplastic material; the top surfaces of the coplanar top-surface-plane crossovers may be monoplanar flat surfaces. Specific embodiments of the invention include satin weaves as well as hybrid weaves of three or greater sheds, and mesh counts of from about 10×10 to about 120×120 filaments per inch (4×4 to about 47×47 per centimeter). Although the preferred range of mesh counts is from about 18 by 16 to about 55 by 48 filaments per inch (9×8 to about 22×19 per centimeter).

Instead of an impression fabric, a dryer fabric may be used as the creping fabric if so desired. Suitable fabrics are described in U.S. Pat. No. 5,449,026 (woven style) and U.S. Pat. No. 5,690,149 (stacked MD tape yarn style) to Lee as well as U.S. Pat. No. 4,490,925 to Smith (spiral style).

A creping adhesive used on the Yankee cylinder is preferably capable of cooperating with the web at intermediate moisture to facilitate transfer from the creping fabric to the Yankee and to firmly secure the web to the Yankee cylinder as it is dried to a consistency of 95% or more on the cylinder, preferably with a high volume drying hood. The adhesive is critical to stable system operation at high production rates and is a hygroscopic, re-wettable, substantially non-crosslinking adhesive. Examples of preferred adhesives are those which include poly(vinyl alcohol) of the general class described in U.S. Pat. No. 4,528,316 to Soerens et al. Other suitable adhesives are disclosed in co-pending U.S. patent application Ser. No. 10/409,042, filed Apr. 9, 2003, (US Publication No. US 2005/0006040, published Jan. 13, 2005), entitled "Improved Creping Adhesive Modifier and Process for Producing Paper Products". The disclosures of the '316 patent and the '255 application are incorporated herein by reference. Suitable adhesives are optionally provided with modifiers and so forth. It is preferred to use crosslinker sparingly or not at all in the adhesive in many cases; such that the resin is substantially non-crosslinkable in use.

FIG. 5 is a schematic diagram of a papermachine 15 having a conventional twin wire forming section 17, a felt run 14, a shoe press section 16, a creping fabric 18 and a Yankee dryer 20 suitable for making sheet used in connection with the present invention. Forming section 17 includes a pair of forming fabrics 22, 24 supported by a plurality of rolls 26, 28, 30, 32, 34, 36 and a forming roll 38. A headbox 40 provides papermaking furnish in the form of a jet to a nip 42 between forming roll 38 and roll 26 and the fabrics. Control of the jet velocity relative to the forming fabrics is an important aspect of controlling tensile ratio as will be appreciated by one of skill in the art. The furnish forms a nascent web 44 which is dewatered on the fabrics with the assistance of suction, for example, by way of suction box 46.

The nascent web is advanced to a papermaking felt 48 which is supported by a plurality of rolls 50, 52, 54, 55 and the felt is in contact with a shoe press roll 56. The web is of low consistency as it is transferred to the felt. Transfer may be assisted by suction; for example roll 50 may be a suction roll if so desired or a pickup or suction shoe as is known in the art. As the web reaches the shoe press roll it may have a consistency of 10-25 percent, preferably 20 to 25 percent or so as it enters nip 58 between shoe press roll 56 and transfer roll 60. Transfer roll 60 may be a heated roll if so desired. Instead of a shoe press roll, roll 56 could be a conventional suction pressure roll. If a shoe press is employed it is desirable and preferred that roll 54 is a suction roll effective to remove water from the felt prior to the felt entering the shoe press nip since water from the furnish will be pressed into the felt in the shoe press nip. In any case, using a suction roll or STR at 54 is typically desirable to ensure the web remains in contact with the felt during the direction change as one of skill in the art will appreciate from the diagram.

Web 44 is wet-pressed on the felt in nip 58 with the assistance of pressure shoe 62. The web is thus compactively dewatered at 58, typically by increasing the consistency by 15 or more points at this stage of the process. The configuration shown at 58 is generally termed a shoe press; in connection with the present invention cylinder 60 is operative as a transfer cylinder which operates to convey web 44 at high speed, typically 1000 fpm-6000 fpm (305 mpm-1830 mpm) to the creping fabric.

Cylinder 60 has a smooth surface 64 which may be provided with adhesive and/or release agents if needed. Web 44 is adhered to transfer surface 64 of cylinder 60 which is rotating at a high angular velocity as the web continues to advance in the machine-direction indicated by arrows 66. On the cylinder, web 44 has a generally random apparent distribution of fiber.

Direction 66 is referred to as the machine-direction (MD) of the web as well as that of papermachine 15; whereas the cross-machine-direction (CD) is the direction in the plane of the web perpendicular to the MD.

Web 44 enters nip 58 typically at consistencies of 10-25 percent or so and is dewatered and dried to consistencies of from about 25 to about 70 by the time it is transferred to creping fabric 18 as shown in the diagram.

Fabric 18 is supported on a plurality of rolls 68, 70, 72 and a press nip roll or solid pressure roll 74 such that there is formed a fabric crepe nip 76 with transfer cylinder 60 as shown in the diagram.

The creping fabric defines a creping nip over the distance in which creping fabric 18 is adapted to contact roll 60; that is, applies significant pressure to the web against the transfer cylinder. To this end, backing (or creping) roll 70 may be provided with a soft deformable surface which will increase the width of the creping nip and increase the fabric creping angle between the fabric and the sheet and the point of contact or a shoe press roll could be used as roll 70 to increase effective contact with the web in high impact fabric creping nip 76 where web 44 is transferred to fabric 18 and advanced in the machine-direction. By using different equipment at the creping nip, it is possible to adjust the fabric creping angle or the takeaway angle from the creping nip. Thus, it is possible to influence the nature and amount of redistribution of fiber, as well as delamination/debonding which may occur at fabric creping nip 76 by adjusting these nip parameters. In some embodiments it may by desirable to restructure the z-direction interfiber characteristics while in other cases it may be desired to influence properties only in the plane of the web. The creping nip parameters can influence the distribution of fiber in the web in a variety of directions, including inducing changes in the z-direction as well as the MD and CD. In any case, the transfer from the transfer cylinder to the creping fabric is high impact in that the fabric is traveling slower than the web and a significant velocity change occurs. Typically, the web is creped anywhere from 10-60 percent and even higher during transfer from the transfer cylinder to the fabric.

Creping nip 76 generally extends over a fabric creping nip width of anywhere from about ⅛" to about 2", typically ½" to 2" (from about 0.32 cm to about 2.54 cm, typically 1.27 cm to 5.08 cm). For a creping fabric with 32 CD strands per inch, web 44 thus will encounter anywhere from about 4 to 64 weft filaments in the nip.

The nip pressure in nip 76, that is, the loading between backing roll 70 and transfer roll 60 is suitably 20-100 (3.6-18 kglcm), preferably 40-70 pounds per linear inch (PLI) (7.1-12.5 kglcm).

After fabric creping, the web continues to advance along MD 66 where it is wet-pressed onto Yankee cylinder 80 in transfer nip 82. Transfer at nip 82 occurs at a web consistency of generally from about 25 to about 70 percent. At these consistencies, it is difficult to adhere the web to surface 84 of cylinder 80 firmly enough to remove the web from the fabric thoroughly. Typically, a poly(vinyl alcohol)/polyamide adhesive composition as noted above is applied at 86 as needed.

If so desired, a suction box may be employed at 67 in order to increase caliper. Typically, suction of from about 5 to about 30 inches of mercury (from about $1.7 \times 10^4$ to about $1.0 \times 10^5$ Pascal) is employed.

The web is dried on Yankee cylinder 80 which is a heated cylinder and by high jet velocity impingement air in Yankee hood 88. As the cylinder rotates, web 44 is creped from the cylinder by creping doctor 89 and wound on a take-up roll 90. Creping of the paper from a Yankee dryer may be carried out using an undulatory creping blade, such as that disclosed in U.S. Pat. No. 5,690,788, the disclosure of which is incorporated by reference. Use of the undulatory crepe blade has been shown to impart several advantages when used in production of tissue products. In general, tissue products creped using an undulatory blade have higher caliper (thickness), increased CD stretch, and a higher void volume than do comparable tissue products produced using conventional crepe blades. All of these changes effected by use of the undulatory blade tend to correlate with improved softness perception of the tissue products.

There is optionally provided a calender station 85 with rolls 85(a), 85(b) to calender the sheet, if so desired.

When a wet-crepe process is employed, an impingement air dryer, a through-air dryer, or a plurality of can dryers can be used instead of a Yankee. Impingement air dryers are disclosed in the following patents and applications, the disclosure of which is incorporated herein by reference:

U.S. Pat. No. 5,865,955 of Ilvespaaet et al.
U.S. Pat. No. 5,968,590 of Ahonen et al.
U.S. Pat. No. 6,001,421 of Ahonen et al.
U.S. Pat. No. 6,119,362 of Sundqvist et al.
U.S. patent application Ser. No. 09/733,172, entitled "Wet Crepe, Impingement-Air Dry Process for Making Absorbent Sheet", now U.S. Pat. No. 6,432,267.

Throughdrying units are well known in the art and described in U.S. Pat. No. 3,432,936 to Cole et al., the disclosure of which is incorporated herein by reference. U.S. Pat. No. 5,851,353 discloses a can-drying system which is also well known in the art.

Preferred aspects of processes including fabric-creping are described in the following co-pending applications: U.S. patent application Ser. No. 11/804,246, filed May 16, 2007, entitled "Fabric Creped Absorbent Sheet with Variable Local Basis Weight"; U.S. patent application Ser. No. 11/678,669, entitled "Method of Controlling Adhesive Build-Up on a Yankee Dryer"; U.S. patent application Ser. No. 11/451,112 (Publication No. US 2006-0289133), filed Jun. 12, 2006, entitled "Fabric-Creped Sheet for Dispensers"; U.S. Ser. No. 11/451,111, filed Jun. 12, 2006 (Publication No. US 2006-0289134), entitled "Method of Making Fabric-creped Sheet for Dispensers"; GP-05-10); U.S. patent application Ser. No. 11/402,609 (Publication No. US 2006-0237154), filed Apr. 12, 2006, entitled "Multi-Ply Paper Towel With Absorbent Core"; GP-04-11); U.S. patent application Ser. No. 11/151,761, filed Jun. 14, 2005 (Publication No. US 2005/0279471), entitled "High Solids Fabric-crepe Process for Producing Absorbent Sheet with In-Fabric Drying"; U.S. application Ser. No. 11/108,458, filed Apr. 18, 2005 (Publication No. US 2005-0241787), entitled "Fabric-Crepe and In Fabric Drying Process for Producing Absorbent Sheet"; U.S. application Ser. No. 11/108,375, filed Apr. 18, 2005 (Publication No. US 2005-0217814), entitled "Fabric-crepe/Draw Process for Producing Absorbent Sheet"; U.S. application Ser. No. 11/104,014, filed Apr. 12, 2005 (Publication No. US 2005-0241786), entitled "Wet-Pressed Tissue and Towel Products With Elevated CD Stretch and Low Tensile Ratios Made With a High Solids Fabric-Crepe Process"; U.S. application Ser. No. 10/679,862 (Publication No. US 2004-0238135), filed Oct. 6, 2003, entitled "Fabric-crepe Process for Making Absorbent Sheet"; U.S. Provisional Patent Application Ser. No. 60/903,789, filed Feb. 27, 2007, entitled "Fabric Crepe Process With Prolonged Production Cycle". The applications referred to immediately above are particularly relevant to the selection of machinery, materials, processing conditions and so forth as to fabric creped products of the present invention and the disclosures of these applications are incorporated herein by reference.

Figure 6:
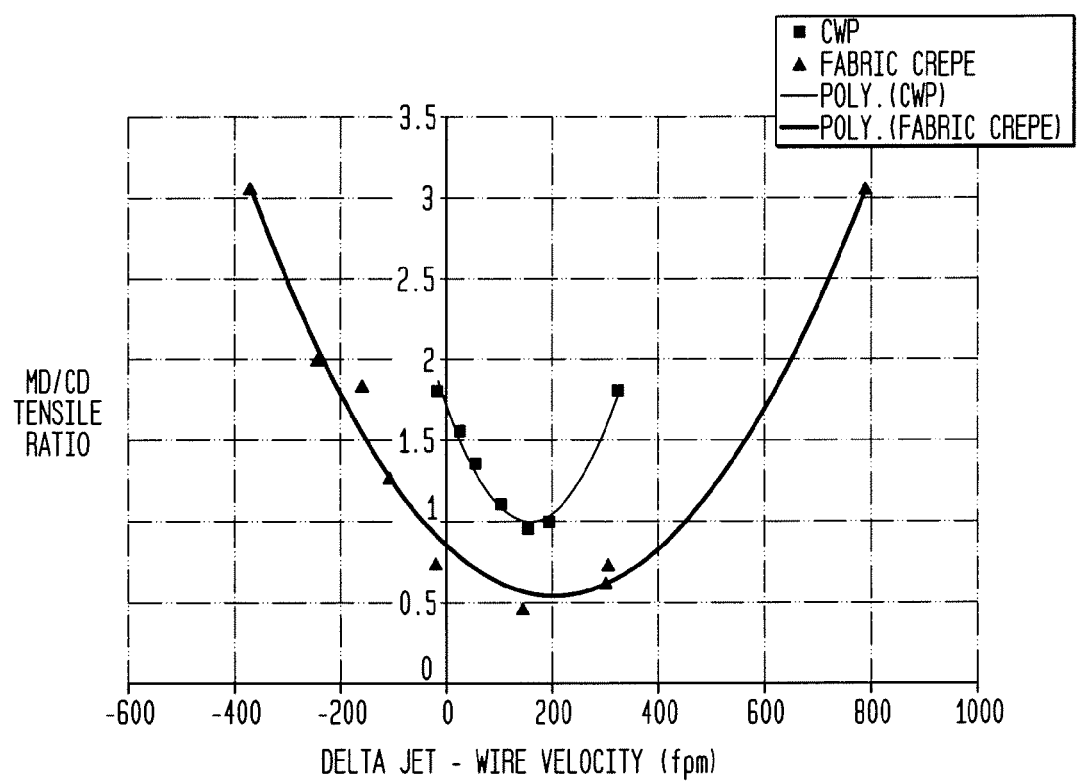
FIG. 6 is a plot of MD/CD dry tensile ratio versus Jet/Wire Velocity differential showing the effect of the jet/wire velocity differential on MD/CD tensile ratio for various products made by the apparatus of FIG. 5 and various prior art products.

The above process allows one to control the MD/CD tensile ratio to a much greater extent than in CWP processes (as will be appreciated from FIG. 6 which appears in U.S. patent application Ser. No. 11/108,375) simply by varying the jet/wire velocity delta.

Two and three-ply absorbent products are described in the following: U.S. Pat. No. 6,746,558 to Hoeft et al. entitled "Absorbent Paper Product of at Least Three Plies and Method of Manufacture"; U.S. Pat. No. 6,261,666 to Enderby et al.; U.S. Pat. No. 5,215,617 to Grupe entitled "Method for Making Plied Towels"; and U.S. Pat. No. 4,803,032 to Shultz entitled "Method of Spot Embossing a Fibrous Sheet", the disclosures of which are incorporated herein by reference. There is shown in FIG. 7 a point-to-point embossed multi-ply structure including upper and lower plies 110, 112. The upper ply is formed with downwardly projecting embossments 114 and the lower ply is formed with upwardly projecting embossments 116. Opposed embossments contact each other and adhesive is advantageously applied to the embossments of one of the plies so that the two plies are adhesively secured together.

Figure 8:
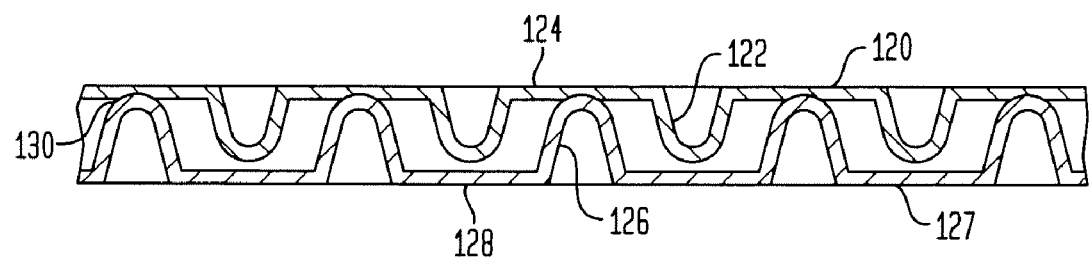
FIG. 8 is a diagram of a multi-ply towel having a nested embossed structure.

FIG. 8 illustrates a conventional two-ply paper product with nested embossments which can be formed in accordance with U.S. Pat. Nos. 3,556,907 and 3,867,225. An upper ply 120 of paper sheet material is provided with downwardly projecting embossments 122 and unembossed areas 124 between the embossments. A lower ply 127 of paper sheet material is provided with upwardly extending embossments 126 and unembossed areas 128 between the embossments. The two plies are arranged so that the embossments of one ply extend into the spaces between the embossments of the other ply. Adhesive 130 is applied to the embossments 126 of the lower ply for adhesively securing the embossments 126 to the unembossed areas 124 of the upper ply.

Figure 9:
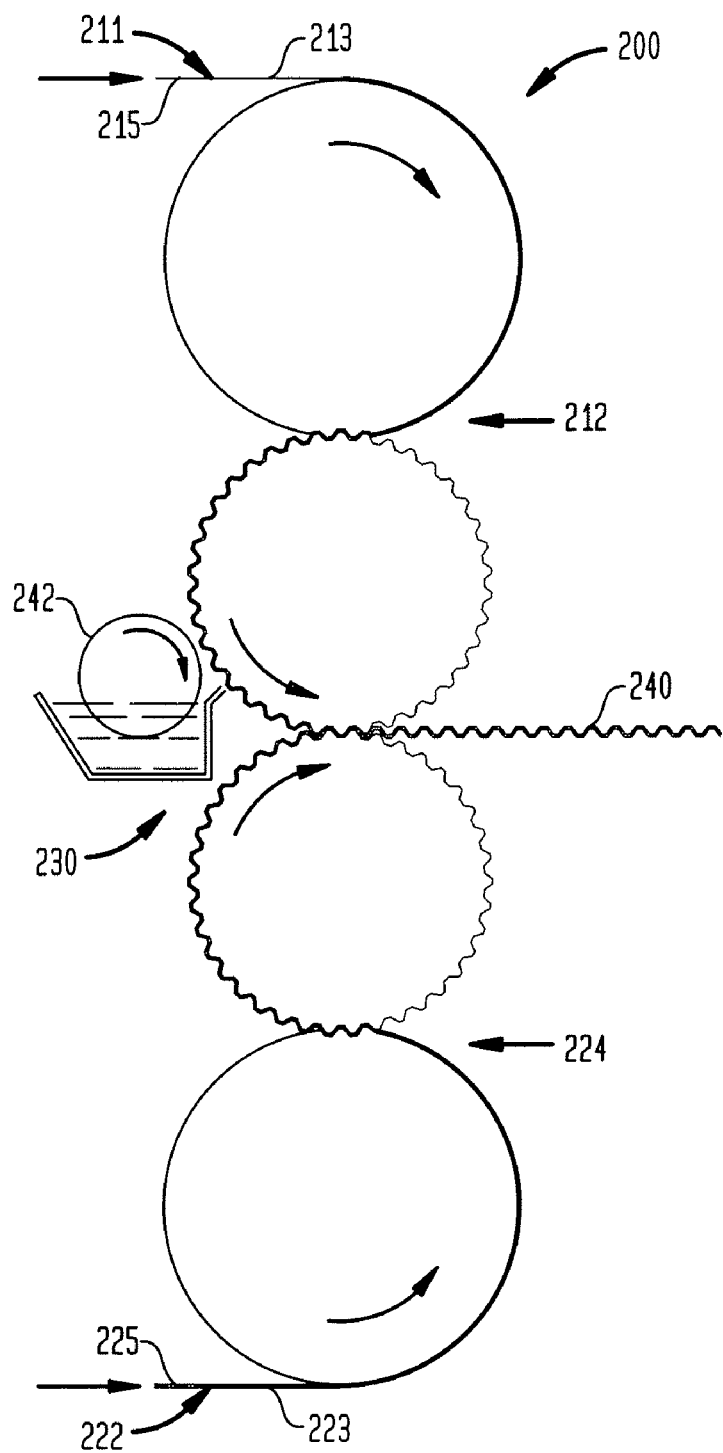
FIG. 9 is a schematic diagram of an embossing and plying process which may be employed in connection with the present invention to make a two-ply heavyweight paper towel.

Referring to FIG. 9, there is shown an embossing and plying apparatus 200 wherein a first ply 211 is embossed by a first pair of rolls 212. Ply 211 has an outer surface 213 as well as an internal surface 215. A second ply 222 is embossed by rolls at 224. Ply 222 also has an outer surface 223 and in internal surface 225. The two plies are fed to plying nip 230 and plied to form a two-ply structure 240 which may be of a nested or point-to-point embossed structure. Optionally, an adhesive is applied to sheet 211 by way of a rotogravure roll indicated at 242 to secure the sheets to one another; in many cases matched elements in nip 230 suffice for purposes of securing the sheets.

The towels of the invention may alternatively be plied after embossing only one of the base sheets as will readily be appreciated from FIG. 9.

The inventive multi-ply structures are also conveniently produced as three-ply structures as shown substantially in FIG. 10. In FIG. 10, there is shown a plying station 250 wherein a central ply 252 having local variation basis weight is plied with outer plies 254, 256. Central ply 252, the core of the absorbent structure, may be of the same or different basis weight as compared with the outer plies. Plies 254, 256 may have local variations in basis weight if so desired, or may be conventional absorbent sheet. The outer surfaces of plies 254, 256 are continuous surfaces.

The embossing station of FIG. 10 includes rolls 258, 260, 262, 264 and 266 which rotate in directions indicated by the arrows and are configured and positioned so that they cooperate to emboss and secure the sheets to each other. Here again, adhesive is optionally used and it will be appreciated that any suitable plying protocol may be employed.

Utilizing the above procedures, multi-ply towels were prepared using fabric-creped base sheet and compared to CWP, DRC, TAD and AL towels of similar composition. Typically the towels include 50% by weight of fiber or more softwood fiber such as, for example Douglas fir Kraft fiber or Southern Softwood Kraft fiber.

EXAMPLES

Representative Example

WO 13 Fabric

Base sheets were produced on a crescent former papermachine from a fiber blend of 80% southern softwood Kraft (SWK) and 20% southern hardwood Kraft (HWK) using the WO 13 fabric noted above. The base sheets were made at a fabric crepe of 30 percent and a reel crepe of 10 percent (43 percent line crepe). The furnish was treated with 25 lbs/ton (12.5 kg/mton) of a wet strength additive (Amres® 25 HP, Georgia Pacific), 5 lbs/ton (12.5 kg/mton) of a charge control/dry strength agent (Wetcell CMC) and 3.5 lbs/ton (1.75 kg/mton) of a debonder (TQ 1152, Hercules). The base sheets were creped from the Yankee dryer at a moisture of 2 percent using a 10-degree beveled crepe blade. The sheets were produced at a reel speed of 1800 fpm (549 m/m).

The base sheets had physical properties as shown in Table 1.

TABLE 1

Average Base Sheet Physical Properties

| | |
|---|---|
| Basis Weight lbs/ream (gsm) | 18.61 (30.28) |
| Caliper mils/8 sheets (mm/8 sheets) | 115.1 (2.92) |
| MD Tensile g/3" (gcm) | 1132 (148.6) |
| CD Tensile g/3" (gcm) | 1037 (136) |
| GM Tensile g/3" (gcm) | 1083 (142.1) |
| MD Stretch (%) | 47.5 |
| CD Stretch (%) | 8.1 |
| CD Wet Tensile - Finch g/3" (gcm) | 339 (44.5) |
| CD Wet/Dry - Finch (%) | 32.7 |
| SAT Capacity (g/sq meter) (2 plies) | 590 |
| SAT Capacity (g/g) | 9.7 |
| SAT Rate (g/sec$^{0.5}$) | 0.19 |
| GM Break Modulus (g/3"/%) (gcm/%) | 55.5 (7.28) |

The base sheets were converted to a two-ply finished product using a nested emboss pattern. The finished product physical properties are presented in Table 2.

TABLE 2

Finished Towel Physical Properties

| | |
|---|---|
| Basis Weight lbs/ream (gsm) | 34.75 (56.5) |
| Caliper mils/8 sheets (mm/8 sheets) | 236.5 (6.01) |
| MD Tensile g/3" (gcm) | 2278 (300.0) |
| CD Tensile g/3" (gcm) | 1783 (234.0) |
| GM Tensile g/3" (gcm) | 2014 (264.3) |
| MD Stretch (%) | 34.8 |
| CD Stretch (%) | 10.2 |
| MD TEA (mm-g/mm$^2$) | 2.64 |
| CD TEA (mm-g/mm$^2$) | 1.27 |
| CD Wet Tensile - Finch g/3" (gcm) | 475 (62.3) |
| CD Wet/Dry - Finch (%) | 26.6 |
| Perf Tensile g/3" (gcm) | 572 (75.1) |
| SAT Capacity (g/sq meter) | 515 |
| SAT Capacity (g/g) | 9.1 |
| SAT Rate (g/sec$^{0.5}$) | 0.18 |
| GM Break Modulus (g/3"/%) (gcm/%) | 107.9 (14.2) |
| GM Tensile Modulus (g/in/%) | 22.9 |
| Roll Diameter (inches) | 5.60 |
| Roll Compression (%) | 10.6 |

Examples 1-17 and A-AD

Additional product was prepared following like procedures and using like compositions. Details appear in Table 3 below and results are summarized in FIGS. 1-3 and 11-18.

It is seen in FIGS. 1-3 that the multi-ply towels of the invention have surprisingly high toughness (TEA) at low stiffness; note FIGS. 2, 3 in particular. In FIG. 11 it is seen that both high CD TEA's and MD TEA's are readily achieved, while in FIG. 12 it is seen that the Break Modulus (stiffness) of the inventive towel is substantially lower than other multi-ply products of comparable weight. Very high MD stretch is demonstrated in FIG. 13; FIGS. 3, 14 confirm the modulus/stiffness properties as to wet CD tensile.

Figure 16:
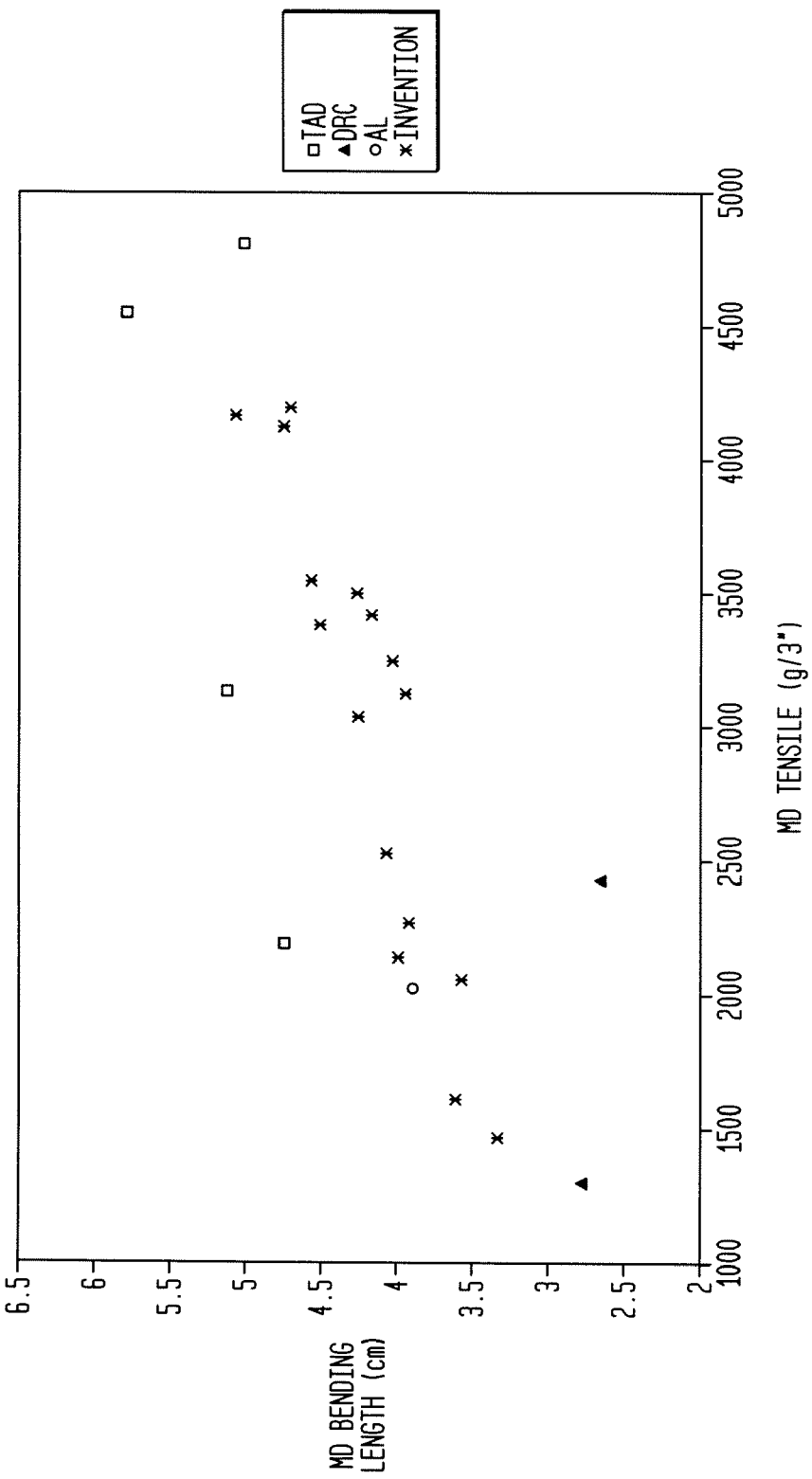
FIG. 16 is a plot of MD Bending Length vs. MD Tensile (g/3") for various products of the invention and various prior art products.

In FIG. 15 it is seen that converting loss is lower for heavyweight fabric-creped towel, while FIG. 16 shows that the invention towel has lower MD bending length than TAD two-ply towel.

FIG. 17 shows that only the DRC (single-ply) towel has as much stretch as the invention multi-ply towels.

FIG. 18 again confirms the low modulus/high toughness relationship exhibited by the invention products.

TABLE 3

Towel Properties

| | Example | | | | | | | | | | | |
|---|---|---|---|---|---|---|---|---|---|---|---|---|
| Technology | 1 FC | 2 FC | 3 FC | 4 FC | 5 FC | 6 FC | 7 FC | 8 FC | 9 FC | 10 FC | 11 FC | 12 FC |
| Basis Weight lb/3000 ft$^2$ | 35.65 | 35.76 | 36.45 | 36.26 | 36.48 | 36.31 | 34.67 | 31.90 | 35.89 | 32.09 | 35.89 | 37.14 |
| (gsm) | (58.01) | (58.19) | (59.13) | (59.00) | (59.36) | (59.09) | (56.42) | (51.91) | (58.40) | (52.22) | (58.40) | (60.44) |
| Caliper mils/8 Sheets | 220.4 | 243.1 | 241.4 | 235.9 | 234.5 | 233.5 | 238.1 | 236.6 | 237.3 | 236.3 | 234.6 | 242.6 |
| (mm/8 Sheets) | (5.60) | (6.17) | (6.13) | (5.99) | (5.95) | (5.93) | (6.05) | (6.01) | (6.03) | (6.00) | (5.96) | (6.16) |
| MD Dry Tensile g/3" | 3415 | 4117 | 3545 | 4160 | 3378 | 4196 | 1610 | 2145 | 3129 | 3032 | 1468 | 3501 |
| (g/cm) | (448) | (540) | (465) | (546) | (443) | (551) | (211) | (281) | (411) | (398) | (193) | (459) |
| CD Dry Tensile g/3" | 2813 | 3469 | 3120 | 3510 | 2840 | 3448 | 1452 | 1789 | 2753 | 2550 | 1925 | 3077 |
| (g/cm) | (369) | (455) | (409) | (461) | (373) | (453) | (191) | (235) | (361) | (335) | (253) | (404) |
| GM Dry Tensile g/3" | 3099 | 3778 | 3325 | 3819 | 3095 | 3803 | 1528 | 1959 | 2934 | 2781 | 1680 | 3280 |
| (g/cm) | (407) | (496) | (436) | (501) | (406) | (499) | (201) | (257) | (385) | (365) | (220) | (430) |
| MD Stretch (%) | 39.1 | 39.7 | 40.3 | 40.6 | 40.4 | 40.4 | 32.6 | 35.7 | 36.5 | 37.6 | 35.8 | 36.0 |
| CD Stretch (%) | 11.6 | 11.4 | 11.8 | 11.8 | 11.6 | 11.1 | 10.9 | 11.0 | 9.7 | 10.1 | 8.6 | 9.2 |
| CD Wet Tensile Finch g/3" | 789 | 983 | 862 | 1,004 | 761 | 993 | 485 | 561 | 964 | 845 | 574 | 1,030 |
| (g/cm) | (104) | (129) | (113) | (132) | (99.9) | (130) | (63.6) | (73.6) | (126) | (111) | (75.3) | (135) |
| CD Wet/Dry Ratio (%) | 28.0 | 28.3 | 27.6 | 28.6 | 26.8 | 28.8 | 33.4 | 31.4 | 35.0 | 33.1 | 29.8 | 33.5 |
| Perf Tensile g/3" | 673 | 819 | 703 | 794 | 655 | 763 | 470 | 601 | 774 | 807 | 404 | 830 |
| (g/cm) | (88.3) | (107) | (92.2) | (104) | (86.0) | (100) | (61.7) | (78.9) | (101) | (106) | (53.0) | (109) |
| SAT Capacity (g/m$^2$) | 488 | 487 | 470 | 447 | 482 | 471 | 511 | 488 | 483 | 467 | 496 | 505 |
| SAT Capacity (g/g) | 8.4 | 8.4 | 7.9 | 7.6 | 8.1 | 8.0 | 9.0 | 9.4 | 8.3 | 8.9 | 8.5 | 8.3 |
| SAT Rate (g/s$^{0.5}$) | 0.24 | 0.24 | 0.25 | 0.22 | 0.26 | 0.23 | 0.19 | 0.20 | 0.16 | 0.18 | 0.18 | 0.16 |
| GM Break Modulus g/3"/% Strain | 145.8 | 177.8 | 153.4 | 176.4 | 141.4 | 179.4 | 80.9 | 99.0 | 156.4 | 141.8 | 95.0 | 180.7 |
| (g/cm/% Strain) | (19.1) | (23.3) | (20.1) | (23.2) | (18.6) | (23.5) | (10.6) | (13.0) | (20.5) | (18.6) | (12.5) | (23.7) |

TABLE 3-continued

Towel Properties

| | | | | | | | | | | | | |
|---|---|---|---|---|---|---|---|---|---|---|---|---|
| GM Modulus g/in/% Strain | 31.9 | 37.9 | 35.5 | 41.4 | 30.8 | 35.3 | 19.4 | 22.8 | 33.2 | 30.7 | 22.4 | 35.8 |
| (g/cm/% Strain) | (12.5) | (14.9) | (14.0) | (16.3) | (12.1) | (13.9) | (7.6) | (9.0) | (13.1) | (12.1) | (8.8) | (14.1) |
| MD TEA (mm-g/mm²) | 6.7 | 8.3 | 7.6 | 9.1 | 6.9 | 8.6 | 2.6 | 4.3 | 5.9 | 6.2 | 3.0 | 6.7 |
| CD TEA (mm-g/mm²) | 2.1 | 2.6 | 2.4 | 2.7 | 2.2 | 2.6 | 1.0 | 1.3 | 1.8 | 1.8 | 1.1 | 2.0 |
| Roll Diameter (in.) | 5.32 | 5.49 | 5.48 | 5.48 | 5.41 | 5.44 | 5.48 | 5.51 | 5.60 | 5.61 | 5.48 | 5.61 |
| (cm) | (13.5) | (13.9) | (13.9) | (13.9) | (13.7) | (13.8) | (13.9) | (14.0) | (14.2) | (14.2) | (13.9) | (14.2) |
| Roll Compression (%) | 6.6 | 7.6 | 6.9 | 8.1 | 6.3 | 6.7 | 10.0 | 11.7 | 11.8 | 12.6 | 11.3 | 12.3 |
| Apparent Bulk (cc/g) | 12.06 | 13.26 | 12.92 | 12.69 | 12.54 | 12.54 | 13.40 | 14.47 | 12.90 | 14.36 | 12.75 | 12.74 |
| CD Wet Breaking Length (m) | 178 | 222 | 191 | 223 | 168 | 221 | 113 | 142 | 217 | 212 | 129 | 224 |
| MD Bending Length (cm) | 4.18 | 4.77 | 4.58 | 5.08 | 4.52 | 4.72 | 3.63 | 4.00 | 3.96 | 4.27 | 3.35 | 4.28 |

| | Example | | | | | | | | | | | |
|---|---|---|---|---|---|---|---|---|---|---|---|---|
| Technology | 13 FC | 14 FC | 15W13 FC | 16 FC | 17W13 FC | A TAD | B TAD | C TAD | D TAD | E TAD | F TAD | G TAD | H TAD |
| Basis Weight lb/3000 ft² | 36.64 | 35.89 | 34.73 | 35.70 | 34.75 | 33.53 | 33.63 | 33.91 | 34.26 | 33.66 | 36.66 | 36.66 | 41.58 |
| (gsm) | (59.6) | (58.4) | (56.5) | (58.1) | (56.5) | (54.6) | (54.7) | (55.2) | (55.8) | (54.8) | (59.7) | (59.7) | (67.7) |
| Caliper mils/8 Sheets | 251.8 | 239.2 | 237.5 | 228.6 | 236.5 | 211.5 | 224.4 | 223.3 | 232.4 | 251.0 | 233.7 | 233.7 | 242.7 |
| (mm/8 Sheets) | (6.39) | (6.08) | (6.03) | (5.81) | (6.01) | (5.37) | (5.70) | (5.67) | (5.90) | (6.37) | (5.94) | (5.94) | (6.16) |
| MD Dry Tensile g/3" | 2278 | 2530 | 3244 | 2063 | 2278 | 2301 | 2071 | 2593 | 3510 | 2830 | 4559 | 4559 | 4802 |
| (g/cm) | (299) | (332) | (426) | (271) | (299) | (302) | (272) | (340) | (461) | (371) | (598) | (598) | (630) |
| CD Dry Tensile g/3" | 1971 | 2957 | 2678 | 1736 | 1783 | 2052 | 1754 | 2083 | 2890 | 2178 | 3453 | 3453 | 4042 |
| (g/cm) | (259) | (388) | (351) | (228) | (234) | (269) | (230) | (273) | (379) | (286) | (453) | (453) | (531) |
| GM Dry Tensile g/3" | 2119 | 2735 | 2946 | 1891 | 2014 | 2173 | 1906 | 2324 | 3185 | 2482 | 3967 | 3967 | 4404 |
| (g/cm) | (278) | (359) | (387) | (248) | (264) | (285) | (250) | (305) | (418) | (326) | (521) | (521) | (578) |
| MD Stretch (%) | 35.8 | 36.1 | 36.2 | 35.4 | 34.8 | 14.1 | 15.5 | 14.3 | 13.2 | 13.3 | 16.2 | 16.2 | 17.0 |
| CD Stretch (%) | 9.9 | 8.1 | 9.9 | 10.8 | 10.2 | 7.9 | 8.0 | 7.5 | 7.3 | 6.8 | 7.7 | 7.7 | 7.9 |
| CD Wet Tensile Finch g/3" | 642 | 926 | 724 | 530 | 475 | 517 | 451 | 525 | 714 | 542 | 964 | 964 | 1084 |
| (g/cm) | (84.3) | (121) | (95.0) | (69.6) | (62.3) | (67.8) | (59.2) | (68.9) | (93.7) | (71.1) | (127) | (127) | (142) |
| CD Wet/Dry Ratio (%) | 32.6 | 31.3 | 27.0 | 30.5 | 26.6 | 25.2 | 25.7 | 25.2 | 24.7 | 24.9 | 27.9 | 27.9 | 26.8 |
| Perf Tensile g/3" | 592 | 649 | 810 | 539 | 572 | 457 | 362 | 444 | 651 | 567 | 1052 | 1052 | 1074 |
| (g/cm) | (77.7) | (85.2) | (106) | (70.7) | (75.1) | (60.0) | (47.5) | (58.3) | (85.4) | (74.4) | (138) | (138) | (141) |
| SAT Capacity (g/m²) | 516 | 471 | 546 | 504 | 515 | 444 | 461 | 503 | 510 | 529 | 537 | 537 | 547 |
| SAT Capacity (g/g) | 8.7 | 8.1 | 9.7 | 8.7 | 9.1 | 8.1 | 8.4 | 9.1 | 9.2 | 9.7 | 9.0 | 9.0 | 8.1 |
| SAT Rate (g/s$^{0.5}$) | 0.19 | 0.16 | 0.24 | 0.18 | 0.18 | 0.15 | 0.15 | 0.18 | 0.21 | 0.23 | 0.21 | 0.21 | 0.16 |
| GM Break Modulus g/3"/% Strain | 112.5 | 160.0 | 155.4 | 96.4 | 107.9 | 206.6 | 171.5 | 224.3 | 325.3 | 261.5 | 355.7 | 355.7 | 382.1 |
| (g/cm/% Strain) | (14.7) | (21.0) | (20.4) | (12.7) | (14.2) | (27.1) | (22.5) | (29.4) | (42.7) | (34.3) | (46.7) | (46.7) | (50.1) |
| GM Modulus g/in/% Strain | 24.7 | 32.0 | 30.6 | 21.5 | 22.9 | 45.3 | 37.2 | 46.8 | 65.8 | 51.7 | 69.3 | 69.3 | 77.1 |
| (g/cm/% Strain) | (9.7) | (12.6) | (12.0) | (8.4) | (9.0) | (17.8) | (14.6) | (18.4) | (25.9) | (20.4) | (27.3) | (27.3) | (30.4) |
| MD TEA (mm-g/mm²) | 4.4 | 5.0 | 5.7 | 3.8 | 2.6 | 2.0 | 1.9 | 2.1 | 2.7 | 2.2 | 4.3 | 4.3 | 4.9 |
| CD TEA (mm-g/mm²) | 1.4 | 1.6 | 1.8 | 1.3 | 1.3 | 1.1 | 1.0 | 1.0 | 1.4 | 1.0 | 1.8 | 1.8 | 2.1 |
| Roll Diameter (in.) | 5.69 | 5.60 | 5.71 | 5.52 | 5.60 | 4.90 | 4.86 | 4.88 | 4.93 | 4.89 | 5.55 | 5.55 | 5.57 |
| (cm) | (14.4) | (14.2) | (14.5) | (14.0) | (14.2) | (12.4) | (12.3) | (12.4) | (12.5) | (12.4) | (14.1) | (14.1) | (14.1) |
| Roll Compression (%) | 11.4 | 13.0 | 11.7 | 12.4 | 10.6 | 13.0 | 13.7 | 15.4 | 13.6 | 16.3 | 9.7 | 9.7 | 8.5 |
| Apparent Bulk (cc/g) | 13.41 | 13.00 | 13.34 | 12.49 | 13.28 | 12.31 | 13.02 | 12.85 | 13.23 | 14.55 | 12.44 | 12.44 | 11.39 |
| CD Wet Breaking Length (m) | 141 | 208 | 168 | 120 | 110 | 124 | 108 | 125 | 168 | 130 | 212 | 212 | 210 |
| MD Bending Length (cm) | 3.93 | 4.08 | 4.05 | 3.59 | | | | | | | | | |

| | Example | | | | | | | | | | | |
|---|---|---|---|---|---|---|---|---|---|---|---|---|
| Technology | I TAD | J TAD | K TAD | L TAD | M TAD | N TAD | O TAD | P TAD | Q TAD | R DRC | S DRC | T DRC |
| Basis Weight lb/3000 ft² | 35.96 | 35.57 | 36.78 | 36.62 | 36.92 | 36.65 | 36.85 | 32.9 | 32.1 | 40.62 | 39.94 | 40.60 |
| (gsm) | (58.52) | (57.88) | (59.85) | (59.59) | (60.08) | (59.64) | (59.97) | (53.54) | (52.24) | (66.10) | (64.99) | (66.07) |
| Caliper mils/8 Sheets | 231.9 | 238.5 | 204.5 | 239.7 | 239.1 | 239.8 | 237.2 | 217.0 | 225.3 | 204.0 | 210.0 | 201.0 |
| (mm/8 Sheets) | (5.89) | (6.06) | (5.19) | (6.09) | (6.07) | (6.09) | (6.02) | (5.51) | (5.72) | (5.18) | (5.33) | (5.10) |
| MD Dry Tensile g/3" | 3323 | 2787 | 3853 | 3133 | 4802 | 2196 | 4544 | 4049 | 3705 | 1304 | 1129 | 1630 |
| (g/cm) | (436) | (366) | (506) | (411) | (630) | (288) | (596) | (531) | (486) | (171) | (148) | (214) |
| CD Dry Tensile g/3" | 2817 | 2202 | 3817 | 2497 | 3565 | 1742 | 3457 | 2871 | 2677 | 797 | 735 | 985 |
| (g/cm) | (370) | (289) | (501) | (328) | (468) | (229) | (454) | (377) | (351) | (105) | (96.5) | (129) |
| GM Dry Tensile g/3" | 3060 | 2476 | 3835 | 2796 | 4137 | 1956 | 3963 | 3409 | 3149 | 1019 | 911 | 1264 |
| (g/cm) | (402) | (325) | (503) | (367) | (543) | (257) | (520) | (447) | (413) | (134) | (120) | (166) |
| MD Stretch (%) | 16.5 | 15.9 | 18.9 | 17.4 | 16.0 | 17.1 | 15.3 | 14.1 | 13.8 | 27.6 | 25.1 | 24.0 |
| CD Stretch (%) | 8.2 | 8.0 | 7.4 | 8.8 | 8.2 | 8.3 | 7.6 | 12.2 | 11.6 | 21.3 | 20.1 | 18.3 |
| CD Wet Tensile Finch g/3" | 701 | 594 | 992 | 663 | 1001 | 515 | 1073 | 905 | 871 | 394 | 348 | 540 |
| (g/cm) | (92.0) | (77.0) | (130) | (87.0) | (131) | (67.6) | (141) | (119) | (114) | (51.7) | (45.7) | (70.9) |
| CD Wet/Dry Ratio (%) | 24.9 | 27.0 | 26.0 | 26.6 | 28.1 | 29.5 | 31.0 | 31.5 | 32.5 | 49.4 | 47.3 | 54.9 |
| Perf Tensile g/3" | 782 | 717 | 794 | 631 | 961 | 431 | 864 | 1008 | 970 | 274 | 251 | 412 |
| (g/cm) | (103) | (94.1) | (104) | (82.8) | (126) | (56.6) | (113) | (132) | (127) | (36.0) | (32.9) | (54.1) |
| SAT Capacity (g/m²) | 548 | 555 | 546 | 542 | 539 | 544 | 515 | 605 | 662 | 584 | 576 | 570 |
| SAT Capacity (g/g) | 9.4 | 9.6 | 9.1 | 9.1 | 9.0 | 9.1 | 8.6 | 11.3 | 12.7 | 8.8 | 8.9 | 8.6 |
| SAT Rate (g/s$^{0.5}$) | 0.18 | 0.18 | 0.16 | 0.20 | 0.20 | 0.15 | 0.17 | 0.22 | 0.27 | 0.16 | 0.16 | 0.15 |

TABLE 3-continued

Towel Properties

| | | | | | | | | | | | |
|---|---|---|---|---|---|---|---|---|---|---|---|
| GM Break Modulus g/3"/% Strain | 261.6 | 218.0 | 322.8 | 226.1 | 363.8 | 163.9 | 368.3 | 260.0 | 248.9 | 41.9 | 40.5 | 61.1 |
| (g/cm/% Strain) | (34.3) | (28.6) | (42.4) | (29.7) | (47.7) | (21.5) | (48.3) | (34.1) | (32.7) | (5.5) | (5.3) | (8.0) |
| GM Modulus g/in/% Strain | 55.3 | 47.7 | 71.8 | 50.9 | 77.4 | 37.7 | 70.4 | 60.3 | 64.0 | 10.1 | 11.0 | 14.2 |
| (g/cm/% Strain) | (21.8) | (18.8) | (28.3) | (20.0) | (30.5) | (14.8) | (27.7) | (23.7) | (25.2) | (4.0) | (4.3) | (5.6) |
| MD TEA (mm-g/mm²) | 3.3 | 2.7 | 4.5 | 3.1 | 4.4 | 2.1 | 3.9 | 4.0 | 3.3 | 2.1 | 1.7 | 2.2 |
| CD TEA (mm-g/mm²) | 1.6 | 1.2 | 2.0 | 1.4 | 1.9 | 1.0 | 1.7 | 2.5 | 2.2 | 1.2 | 1.1 | 1.2 |
| Roll Diameter (in.) | 5.53 | 5.59 | 5.21 | 5.57 | 5.60 | 5.58 | 5.61 | 4.86 | 5.87 | 4.64 | 5.38 | 4.84 |
| (cm) | (14.0) | (14.2) | (13.2) | (14.1) | (14.2) | (14.2) | (14.2) | (12.3) | (14.9) | (11.8) | (13.7) | (12.3) |
| Roll Compression (%) | 10.5 | 9.8 | 10.0 | 8.1 | 9.6 | 8.0 | 10.2 | 11.9 | 9.8 | 6.9 | 5.8 | 7.95 |
| Apparent Bulk (cc/g) | 12.58 | 13.08 | 10.85 | 12.77 | 12.64 | 12.76 | 12.56 | 12.87 | 13.69 | 9.80 | 10.25 | 9.66 |
| CD Wet Breaking Length (m) | 157 | 135 | 217 | 146 | 219 | 113 | 235 | 222 | 219 | 78 | 70 | 107 |
| MD Bending Length (cm) | | | | | 5.14 | 5.02 | 4.76 | 5.81 | | | 2.78 | |

| | Example | | | | | | | | | |
|---|---|---|---|---|---|---|---|---|---|---|
| Technology | U DRC | V DRC | W DRC | X Air Laid | Y CWP | Z CWP | AA CWP | AB CWP | AC CWP | AD CWP |
| Basis Weight lb/3000 ft² | 41.22 | 46.23 | 50.07 | 35.20 | 33.9 | 32.3 | 32.7 | 32.3 | 32.0 | 34.1 |
| (gsm) | (67.1) | (75.2) | (81.5) | (57.3) | (55.2) | (52.6) | (53.2) | (52.6) | (52.1) | (55.5) |
| Caliper mils/8 Sheets | 200.5 | 195.1 | 225.8 | 199.1 | 154 | 151 | 163 | 142 | 147 | 185 |
| (mm/8 Sheets) | (5.09) | (4.95) | (5.73) | (5.05) | (3.91) | (3.83) | (4.14) | (3.61) | (3.73) | (4.70) |
| MD Dry Tensile g/3" | 1523 | 2433 | 2062 | 2030 | 5083 | 3601 | 4510 | 5193 | 4337 | 3276 |
| (g/cm) | (200) | (319) | (271) | (266) | (667) | (473) | (592) | (682) | (569) | (430) |
| CD Dry Tensile g/3" | 981 | 1548 | 1361 | 1503 | 3334 | 2235 | 2996 | 3111 | 2520 | 1703 |
| (g/cm) | (129) | (203) | (179) | (197) | (438) | (293) | (393) | (408) | (331) | (224) |
| GM Dry Tensile g/3" | 1220 | 1938 | 1673 | 1746 | 4114 | 2837 | 3676 | 4019 | 3306 | 2362 |
| (g/cm) | (160) | (254) | (220) | (229) | (539) | (372) | (482) | (527) | (434) | (310) |
| MD Stretch (%) | 26.3 | 26.8 | 20.2 | 11.8 | 15.7 | 15.1 | 18.6 | 9.6 | 14.7 | 19.0 |
| CD Stretch (%) | 17.8 | 21.2 | 14.9 | 16.4 | 5.5 | 6.3 | 5.4 | 4.6 | 7.4 | 4.8 |
| CD Wet Tensile Finch g/3" | 505 | 854 | 785 | 750 | 626 | 487 | 566 | 806 | 563 | 398 |
| (g/cm) | (66.7) | (112) | (103) | (98.4) | (82.1) | (63.9) | (74.3) | (105) | (73.9) | (52.2) |
| CD Wet/Dry Ratio (%) | 51.5 | 55.2 | 57.7 | 49.9 | 18.8 | 18.8 | 18.8 | 25.9 | 22.3 | 23.4 |
| Perf Tensile g/3" | 376 | 651 | 536 | 502 | 829 | 734 | 723 | 1088 | 777 | 662 |
| (g/cm) | (49.3) | (85.4) | (70.3) | (65.9) | (108) | (96.3) | (94.9) | (143) | (102) | (86.9) |
| SAT Capacity (g/m²) | 564 | 540 | 708 | 588 | 308 | 313 | 312 | 322 | 287 | 393 |
| SAT Capacity (g/g) | 8.4 | 7.2 | 8.7 | 10.3 | 5.6 | 6.0 | 5.9 | 6.1 | 5.5 | 7.1 |
| SAT Rate (g/s$^{0.5}$) | 0.15 | 0.16 | 0.17 | 0.23 | 0.08 | 0.08 | 0.09 | 0.12 | 0.11 | 0.12 |
| GM Break Modulus g/3"/% Strain | 56.7 | 82.0 | 96.5 | 124.2 | 444.8 | 290.9 | 367.8 | 602.0 | 318.1 | 247.3 |
| (g/cm/% Strain) | (7.4) | (10.8) | (12.7) | (16.3) | (58.4) | (38.2) | (48.3) | (79.0) | (41.7) | (32.4) |
| GM Modulus g/in/% Strain | 13.5 | 17.3 | 22.5 | 29.9 | 68.3 | 72.7 | 93.4 | 81.6 | 75.7 | 67.0 |
| (g/cm/% Strain) | (5.3) | (6.8) | (8.9) | (11.8) | (26.9) | (28.6) | (36.8) | (32.1) | (29.8) | (26.4) |
| MD TEA (mm-g/mm²) | 2.2 | 3.6 | 2.3 | 1.8 | 5.0 | 3.6 | 5.3 | 2.8 | 4.2 | 3.7 |
| CD TEA (mm-g/mm²) | 1.2 | 2.3 | 1.4 | 1.7 | 1.3 | 1.0 | 1.2 | 1.0 | 1.3 | 0.6 |
| Roll Diameter (in.) | 5.53 | 3.64 | 4.65 | 4.89 | 5.19 | 5.12 | 5.31 | 4.72 | 5.81 | 5.20 |
| (cm) | (14.0) | (9.2) | (11.8) | (12.4) | (13.2) | (13.0) | (13.5) | (12.0) | (14.8) | (13.2) |
| Roll Compression (%) | 6.71 | 7.3 | 11.4 | 10.64 | 13.4 | 10.6 | 14.0 | 18.4 | 9.6 | 11.1 |
| Apparent Bulk (cc/g) | 9.49 | 8.23 | 8.80 | 11.03 | 8.84 | 9.13 | 9.71 | 8.57 | 8.96 | 10.60 |
| CD Wet Breaking Length (m) | 99 | 149 | 126 | 172 | 149 | 122 | 140 | 201 | 142 | 94 |
| MD Bending Length (cm) | | 2.67 | | 3.90 | | | | | | |

As is seen in FIG. 15, a heavyweight towel has less SAT converting loss than lower basis weights. This feature is used to advantage especially when drawing the towel along its machine direction as is seen in the following examples.

Converting/Drawing Examples

Single sheets were conditioned in a TAPPI standard test station and allowed to come to equilibration. Sheets were then taken from the rolls supplied and tested as follows:
1) 8"×10" (20.32 cm×25.4 cm) samples were cut from sheets taken off the rolls;
2) Some of these samples were then tested for MD tensile, MD stretch, and SAT for controls;
3) Based upon the MD stretch of these samples, the rest of the 8"×10" (20.32 cm×25.4 cm) sheets were put into a special clamping device and put into the Instron tensile tester where approximately half the MD stretch was pulled out;
4) These pulled out samples were then cut into the proper sized samples for tensile and SAT measurements; and
5) This procedure was also followed for the FC samples, with an extra sample pulled to the same degree as the TAD samples so that a direct comparison could be made. (Note: these tests clearly show the potential for non-linear behavior with sheet pullout.)

Results appear in Table 4:

TABLE 4

SAT Loss With Pullout

| | MD Stretch | SAT Before g/m² | % Pullout | SAT After g/m² | Basis Weight |
|---|---|---|---|---|---|
| 36# TAD High Strength Towel | 14.8% | 535 | 7.5 | 532 | 33.5 |
| 36# TAD High Softness Towel | 15.6% | 550 | 7.5 | 549 | 33.5 |
| FC Towel | 38.5% | 508 | 7.5 19.00 | 520 477 | |

It is seen from Table 4 that the sheets exhibited very little SAT loss upon pullout, and that the fabric-creped towel actually exhibited an absorbency increase at 7.5% pullout.

While the invention has been described in connection with several examples, modifications to those examples within the spirit and scope of the invention will be readily apparent to those of skill in the art. In view of the foregoing discussion, relevant knowledge in the art and references including co-pending applications discussed above in connection with the Background and Detailed Description, the disclosures of which are all incorporated herein by reference, further description is deemed unnecessary.

What is claimed is:

1. A method of making a paper towel comprising:
   (a) preparing a plurality of base sheets by way of (i) compactively dewatering a papermaking furnish to form a nascent web having an apparently random distribution of papermaking fiber; (ii) applying the dewatered web having the apparently random fiber distribution to a translating transfer surface moving at a first speed; and (iii) fabric-creping the web from the transfer surface at a consistency of from about 30 to about 60 percent utilizing a patterned creping fabric, the creping step occurring under pressure in a fabric creping nip defined between the transfer surface and the creping fabric wherein the fabric is traveling at a second speed slower than the speed of said transfer surface, the fabric pattern, nip parameters, velocity delta and web consistency being selected such that the web is creped from the transfer surface and redistributed on the creping fabric to form a web with a structure having a plurality of interconnected regions of different local basis weights including at least (A) a plurality of fiber enriched regions of high local basis weight, interconnected by way of (B) a plurality of lower local basis weight linking regions; and (iv) drying the web to form base sheets;
   (b) embossing the web prepared in step (a);
   (c) plying the embossed web together with another ply to form a multi-ply towel, and
   (d) pulling out the multi-ply towel in a machine direction to a target weight,
   wherein the base sheets are prepared, embossed and adhered together such that the towel exhibits a GM TEA, mm-g/mm$^2$, of greater than [0.00952 (GM Tensile, g/cm)−0.75] as well as a GM Tensile Modulus, g/cm/%, less than [0.0249 (GM Tensile Strength, g/cm)+6.06].

2. The method of making a paper towel according to claim 1, wherein the steps of embossing and plying the base sheets produces a nested emboss structure.

3. The method of making a paper towel according to claim 1, produces a point-to-point emboss structure.

4. A method of making a paper towel comprising:
   (a) preparing a base sheet by way of (i) compactively dewatering a papermaking furnish to form a nascent web having an apparently random distribution of papermaking fiber; (ii) applying the dewatered web having the apparently random fiber distribution to a translating transfer surface moving at a first speed; and (iii) fabric-creping the web from the transfer surface at a consistency of from about 30 to about 60 percent utilizing a patterned creping fabric, the creping step occurring under pressure in a fabric creping nip defined between the transfer surface and the creping fabric wherein the fabric is traveling at a second speed slower than the speed of said transfer surface, the fabric pattern, nip parameters, velocity delta and web consistency being selected such that the web is creped from the transfer surface and redistributed on the creping fabric to form a web with a structure having a plurality of interconnected regions of different local basis weights including at least (A) a plurality of fiber enriched regions of high local basis weight, interconnected by way of (B) a plurality of lower local basis weight linking regions; and (iv) drying the web to form the base sheet;
   (b) embossing the web prepared in step (a);
   (c) plying the embossed web together with another ply to form a multi-ply towel, and
   (d) pulling out the multi-ply towel in a machine direction to a target weight,
   wherein the base sheets are prepared, embossed and adhered together such that the towel exhibits a GM TEA, mm-g/mm$^2$, of greater than [0.00952 (GM Tensile, g/cm)−0.75] as well as a GM Tensile Modulus, g/cm/%, less than [0.0249 (GM Tensile Strength, g/cm)+6.06].

5. A method of making a multi-ply paper towel comprising the sequential steps of:
   (a) embossing a plurality of fabric creped base sheets;
   (b) adhering the embossed base sheets together to form a multi-ply embossed towel; and
   (c) drawing the multi-ply embossed towel along its machine direction,
   wherein each of the base sheets has a plurality of interconnected regions of different local basis weights, including at least (A) a plurality of fiber enriched regions of high local basis weight, interconnected by way of (B) a plurality of lower local basis weight linking regions; and wherein the base sheets are selected and the steps of embossing, adhering and drawing are controlled such that the drawn towel has a basis weight of greater than 30 lbs per 3000 ft$^2$ ream (48.8 gsm) and the towel web has an SAT value of between 5 g/g and 12 g/g and an SAT converting loss of less than 15%.

6. The method according to claim 5, wherein the drawn towel has an SAT converting loss of less than 10%.

7. The method according to claim 5, wherein the drawn towel has an SAT converting loss of less than 5%.

8. The method according to claim 5, wherein the drawn towel has an SAT converting gain.

9. The method according to claim 5, wherein the drawn towel has an SAT converting gain of at least 2%.

10. The method according to claim 5, wherein the embossed towel is drawn along its machine direction at least about 5%.

11. The method according to claim 5, wherein the embossed towel is drawn along its machine direction at least about 10%.

12. The method according to claim 5, wherein the embossed towel is drawn along its machine direction at least about 15%.

13. The method according to claim 5, wherein the embossed towel is drawn along its machine direction at least about 20%.

14. The method according to claim 5, wherein the drawn towel has a basis weight of greater than 32 lbs per 3000 ft2 ream (52.1 gsm).

15. The method according to claim 5, wherein the drawn towel has a basis weight of greater than 35 lbs per 3000 ft2 ream (57.0 gsm).

16. The method according to claim 5, wherein the drawn towel has a basis weight of greater than 32 lbs per 3000 ft2 ream (52.1 gsm) and less than 50 lbs per 3000 ft2 ream (81.4 gsm).

17. The method according to claim 5, wherein at least one of the base sheet webs is a throughdried web.

18. The method according to claim 5, wherein at least one of the base sheet webs is a compactively dewatered, fabric-creped web.

19. The method according to claim 5, wherein at least one of the base sheet webs has an MD/CD tensile ratio of less than 1.

20. The method according to claim 5, wherein at least one of the base sheet webs has an MD/CD tensile ratio of less than 0.5.

21. The method according to claim 5, wherein at least one of the base sheet webs has an MD stretch at break of at least 20%.

22. The method according to claim 5, wherein at least one of the base sheet webs has an MD stretch at break of at least 30%.

23. The method according to claim 5, wherein at least one of the base sheet webs has an MD stretch at break of at least 45%.

24. The method according to claim 5, wherein at least one of the base sheet webs has an MD stretch at break of at least 60%.

25. The method according to claim 5, wherein at least one of the base sheet webs has an MD stretch at break greater than 20% and less than 70%.

26. A method of making a multi-ply paper towel comprising the sequential steps of:
(a) embossing a fabric creped base sheet;
(b) adhering the embossed base sheet to another fabric creped base sheet to form a multi-ply towel; and
(c) drawing the multi-ply towel along its machine direction, wherein each said fabric creped base sheet has a plurality of interconnected regions of different local basis weights, including at least (A) a plurality of fiber enriched regions of high local basis weight, interconnected by way of (B) a plurality of lower local basis weight linking regions; and wherein the base sheets are selected and the steps of embossing, adhering and drawing are controlled such that the drawn towel has a basis weight of greater than 30 lbs per 3000 ft$^2$ ream (48.8 gsm) and the towel web has an SAT value of between 5 g/g and 12 g/g and an SAT converting loss of less than 15%.

27. The method according to claim 26, wherein the drawn towel has an SAT converting loss of less than 5%.

28. The method according to claim 26, wherein the drawn towel has an SAT converting gain.

29. The method according to claim 26, wherein the drawn towel has an SAT converting gain of at least 2%.

\* \* \* \* \*